(12) United States Patent
Furuya et al.

(10) Patent No.: US 11,211,033 B2
(45) Date of Patent: Dec. 28, 2021

(54) AGENT DEVICE, METHOD OF CONTROLLING AGENT DEVICE, AND STORAGE MEDIUM FOR PROVIDING SERVICE BASED ON VEHICLE OCCUPANT SPEECH

(71) Applicant: HONDA MOTOR CO., LTD., Tokyo (JP)

(72) Inventors: Sawako Furuya, Wako (JP); Yusuke Oi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/808,414

(22) Filed: Mar. 4, 2020

(65) Prior Publication Data

US 2020/0286450 A1   Sep. 10, 2020

(30) Foreign Application Priority Data

Mar. 7, 2019   (JP) .............................. JP2019-041558

(51) Int. Cl.
*G09G 5/36*  (2006.01)
*G09G 5/37*  (2006.01)
*G06F 3/16*  (2006.01)
*G06T 13/80*  (2011.01)

(52) U.S. Cl.
CPC ............. *G09G 5/363* (2013.01); *G06F 3/167* (2013.01); *G06T 13/80* (2013.01); *G09G 5/37* (2013.01); *G09G 2354/00* (2013.01); *G09G 2380/10* (2013.01)

(58) Field of Classification Search
CPC .... G06F 3/167; G09G 2380/10; G09G 5/363; G09G 5/37; G09G 2354/00; G06T 13/80
See application file for complete search history.

(56) References Cited

U.S. PATENT DOCUMENTS

| 6,006,161 | A | * | 12/1999 | Katou | .................. | G08G 1/0969 |
| | | | | | | 701/410 |
| 2008/0071547 | A1 | * | 3/2008 | Prieto | .................... | B60N 2/002 |
| | | | | | | 704/275 |
| 2010/0118037 | A1 | * | 5/2010 | Sheikh | .................. | G06T 11/001 |
| | | | | | | 345/473 |
| 2011/0298808 | A1 | * | 12/2011 | Rovik | .................... | B60K 35/00 |
| | | | | | | 345/473 |

(Continued)

FOREIGN PATENT DOCUMENTS

JP   2006-335231       12/2006
JP   2006335231 A  *  12/2006

*Primary Examiner* — Terrell M Robinson
(74) *Attorney, Agent, or Firm* — Amin, Turocy & Watson, LLP

(57) ABSTRACT

An agent device includes: an agent functional unit configured to provide a service including an output of a response to a voice to an outputter in response to a speech of an occupant of a vehicle; and a display controller configured to cause a display provided in the vehicle to display an animation regarding an agent corresponding to the agent functional unit. The display controller moves the animation between a first display area included in the display and a second display area of which a position is different from a position of the first display area in the vehicle in response to an instruction from the occupant.

16 Claims, 14 Drawing Sheets

(56) References Cited

U.S. PATENT DOCUMENTS

| | | | |
|---|---|---|---|
| 2013/0218412 A1* | 8/2013 | Ricci | G06F 3/0484 |
| | | | 701/36 |
| 2014/0145933 A1* | 5/2014 | Chae | B60K 37/06 |
| | | | 345/156 |
| 2015/0177956 A1* | 6/2015 | Han | G06F 3/048 |
| | | | 715/771 |
| 2018/0047201 A1* | 2/2018 | Filev | G01C 21/3608 |

* cited by examiner

AGENT DEVICE, METHOD OF CONTROLLING AGENT DEVICE, AND STORAGE MEDIUM FOR PROVIDING SERVICE BASED ON VEHICLE OCCUPANT SPEECH

CROSS-REFERENCE TO RELATED APPLICATION

Priority is claimed on Japanese Patent Application No. 2019-041558, filed Mar. 7, 2019, the content of which is incorporated herein by reference.

BACKGROUND

Field of the Invention

The present invention relates to an agent device, a method of controlling the agent device, and a storage medium.

Description of Related Art

In the related art, a technology for an agent function of providing control of a vehicle, information regarding driving support in response to a request from an occupant, another application and the like while taking with the occupant of the vehicle has been disclosed (see Japanese Unexamined Patent Application, First Publication No. 2006-335231).

SUMMARY

In recent years, mounting an agent function on a vehicle has been implemented, but a display type at the time of activation of the agent function has not been sufficiently examined. Therefore, in the technology of the related art, display may not be realized in an appropriate aspect in some cases.

The present invention is devised in view of such circumstances and an objective of the present invention is to provide an agent device, a method of controlling the agent device, and a storage medium capable of realizing in-vehicle display in an appropriate aspect when an agent provides a service.

An agent device, a method of controlling the agent device, and a storage medium according to the present invention adopt the following configurations.

(1) According to an aspect of the present invention, an agent device includes: an agent functional unit configured to provide a service including an output of a response by sound in response to a speech of an occupant of a vehicle; and a display controller configured to cause a display provided in the vehicle to display an animation regarding an agent corresponding to the agent functional unit. The display controller moves the animation between a first display area included in the display and a second display area of which a position is different from a position of the first display area in the vehicle in response to an instruction from the occupant.

(2) In the agent device according to the aspect (1), the display controller may cause the display to display the animation in one of the first display area and the second display area based on a position at which an occupant speaks in the vehicle.

(3) In the agent device according to the aspect (1), the agent functional unit may acquire a speech of the occupant based on an output from one or more microphones provided in the vehicle and cause directivity at the time of acquisition of the speech of the occupant to differ between a case in which the animation is displayed in the first display area and a case in which the animation is displayed in the second display area.

(4) In the agent device according to the aspect (1), the agent functional unit may provide the service based on the display area in which the animation is displayed between the first display area and the second display area and a speech by an occupant of a seat to which a position assumed to be a head of a sitting occupant is closest.

(5) In the agent device according to the aspect (1), a position of the first display area in the vehicle may be closer to a position at which a head of a driver is assumed to be located than the second display area is.

(6) In the agent device according to the aspect (1), the display controller may move the animation in response to a touch operation on the animation when a detector that is integrated with the display and detects a touch operation detects at least the touch operation on the animation.

(7) In the agent device according to the aspect (1), when the animation is moved from one display area to another display area, the display controller may cause the display to display the animation in the middle of movement by the agent from the one display area to the other display area.

(8) In the agent device according to the aspect (1), the display controller may cause the display to display agent information provided in response to a speech of the occupant and cause a display type of the agent information to differ between a case in which the agent information is displayed in a display area in which the animation is displayed and a case in which the agent information is displayed in a display area in which the animation is not displayed.

(9) In the agent device according to the aspect (8), the display controller may cause the display type of the agent information to differ in response to movement of the animation between a case in which the agent information is displayed in the first display area and a case in which the agent information is displayed in the second display area.

(10) In the agent device according to the aspect (8), the display controller may cause the display type of the agent information to differ so that an information amount of the agent information differs.

(11) In the agent device according to the aspect (8), the display controller may cause the display to display details of the agent information in the display area to which the animation is moved between the first display area and the second display area and cause the display to display an overview of the agent information in the display area in which the animation is displayed before the movement.

(12) In the agent device according to the aspect (8), the display controller may change display of the first display area to information which is based on part of the agent information designated by the occupant when the occupant designates the part of the agent information displayed in the second display area.

(13) In the agent device according to the aspect (1), the display controller may move the animation between the first display area and the second display area depending on a driving situation of the vehicle.

(14) I According to another aspect of the present invention, there is provided a method of controlling the agent device, the method causing a computer: to provide a service including an output of a response by sound in response to a speech of an occupant of a vehicle by an agent function; to cause a display provided in the vehicle to display an animation regarding an agent corresponding to the agent function by a display controller; and to move the animation between a first display area included in the display and a second display area of which a position is different from a position of the first display area in the vehicle in response to an instruction from the occupant.

(15) According to still another aspect of the present invention, a computer-readable non-transitory storage medium stores a program causing a computer: to provide a service including an output of a response by sound in response to a speech of an occupant of a vehicle by an agent function; to cause a display provided in the vehicle to display an animation regarding an agent corresponding to the agent function by a display controller; and to move the animation between a first display area included in the display and a second display area of which a position is different from a position of the first display area in the vehicle in response to an instruction from the occupant.

According to the aspects (1) to (15), it is possible to realize in-vehicle display in an appropriate aspect when an agent provides a service.

DESCRIPTION OF EMBODIMENTS

Hereinafter, embodiments of an agent device, a method of controlling the agent device, and a storage medium according to the present invention will be described with reference to the drawings. The agent device is a device that realizes a part or all of an agent system. Hereinafter, an agent device that is mounted in a vehicle (hereinafter referred to as a vehicle M) and has a plurality of kinds of agent functions will be described as an example of the agent device. The agent function is, for example, a function of providing various kinds of information which is based on a request (a command) included in a speech of an occupant while talking with the occupant of the vehicle M or relaying a network service. A function, a process procedure, control, and an output aspect, and content implemented by each of the plurality of kinds of agents may differ. Of the agent functions, there may be a function of performing control and the like on devices (for example, devices related to driving control or vehicle body control) in a vehicle.

The agent function is realized, for example, by using a natural language processing function (a function of understanding a text structure or meaning), a dialog management function, a network searching function of searching for other devices via a network or searching a predetermined database owned by an own device, and the like in an integrated manner in addition to a voice recognition function of recognizing a voice of an occupant (a function of creating text of a voice). Some or all of the functions may be realized in accordance with an artificial intelligence (AI) technology. A part (in particular, a voice recognition function or a natural language processing and analyzing function) of a configuration for realizing these functions may be mounted on an agent server (an external device) capable of communicating with a general-purpose communication device brought in the vehicle M or an in-vehicle communication device of the vehicle M. In the following description, it is assumed that the part of the configuration is mounted on an agent server, and the agent device and the agent server realize an agent system in cooperation.

<Overall Configuration>

Figure 1:
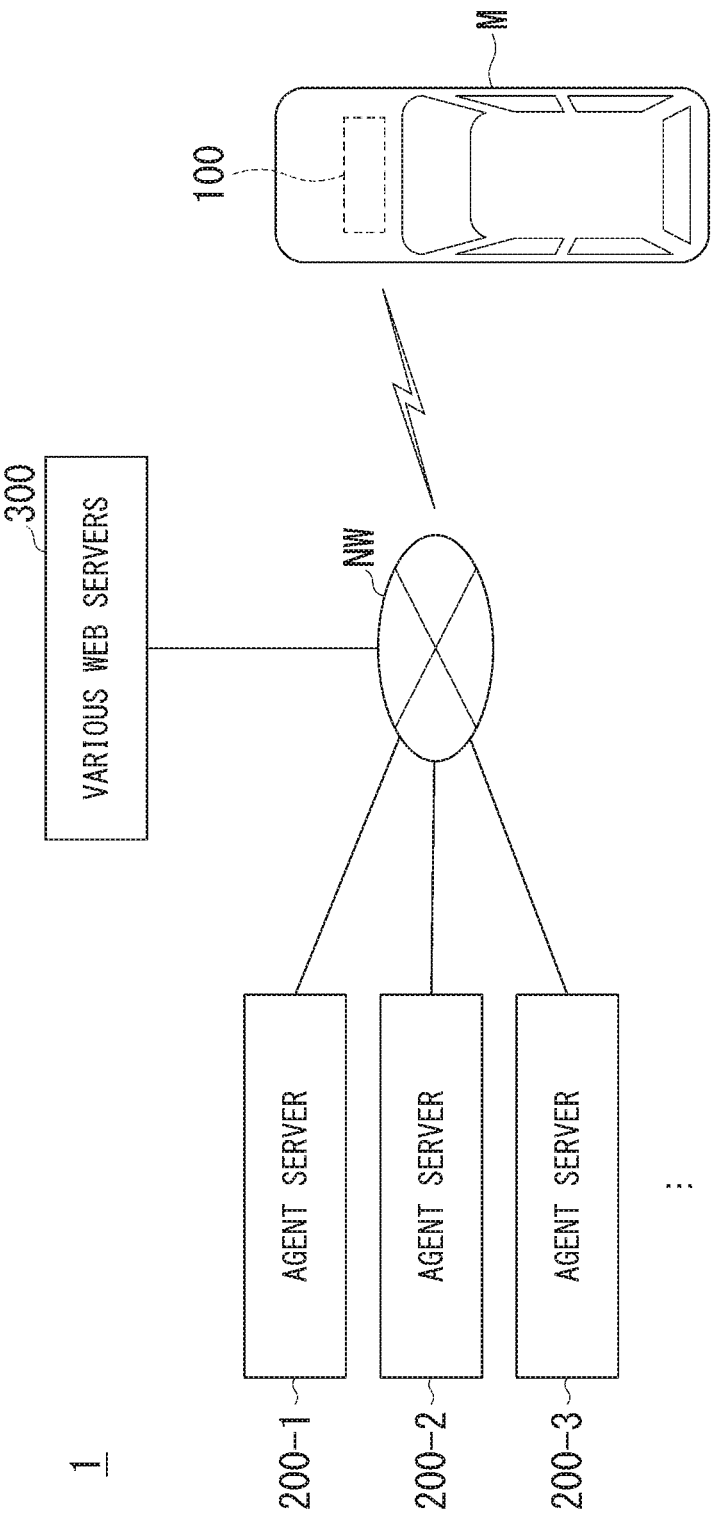
FIG. 1 is a diagram illustrating a configuration of an agent system including an agent device.

FIG. 1 is a diagram illustrating a configuration of an agent system 1 including an agent device 100. The agent system 1 includes, for example, the agent device 100 and a plurality of agent servers 200-1, 200-2, 200-3, and the like. Numbers after hyphens at the ends of reference numerals serve as identifiers used to distinguish agents from each other. When agent servers are not distinguished from each other, the agent servers are simply referred to as agent servers 200 in some cases. In FIG. 1, three agent servers 200 are shown, but the number of agent servers 200 may be 2 or may be 4 or more. Each agent server 200 is administrated by a provider of a mutually different agent system. Accordingly, an agent according to the present invention is an agent that is realized by a mutually different provider. Examples of the agent include an automobile maker, a network service provider, an electronic transaction provider, and a seller and a manufacturer of a portable terminal. Any entity (a corporation, a group, a person, or the like) can serve as a provider of the agent system.

The agent device 100 communicates with the agent servers 200 via a network NW. The network NW includes, for example, some or all of the Internet, a cellular network, a Wi-Fi network, a wide area network (WAN), a local area network (LAN), a public network, a telephone network, and a wireless base station. Various web servers 300 are connected to the network NW so that the agent server 200 or the agent device 100 can acquire web pages from the various web servers 300 via the network NW.

The agent device 100 talks with an occupant of the vehicle M, transmits a voice from the occupant to the agent server 200, and presents a response obtained from the agent server 200 to the occupant in the form of a voice output or image display.

First Embodiment

[Vehicle]

Figure 2:
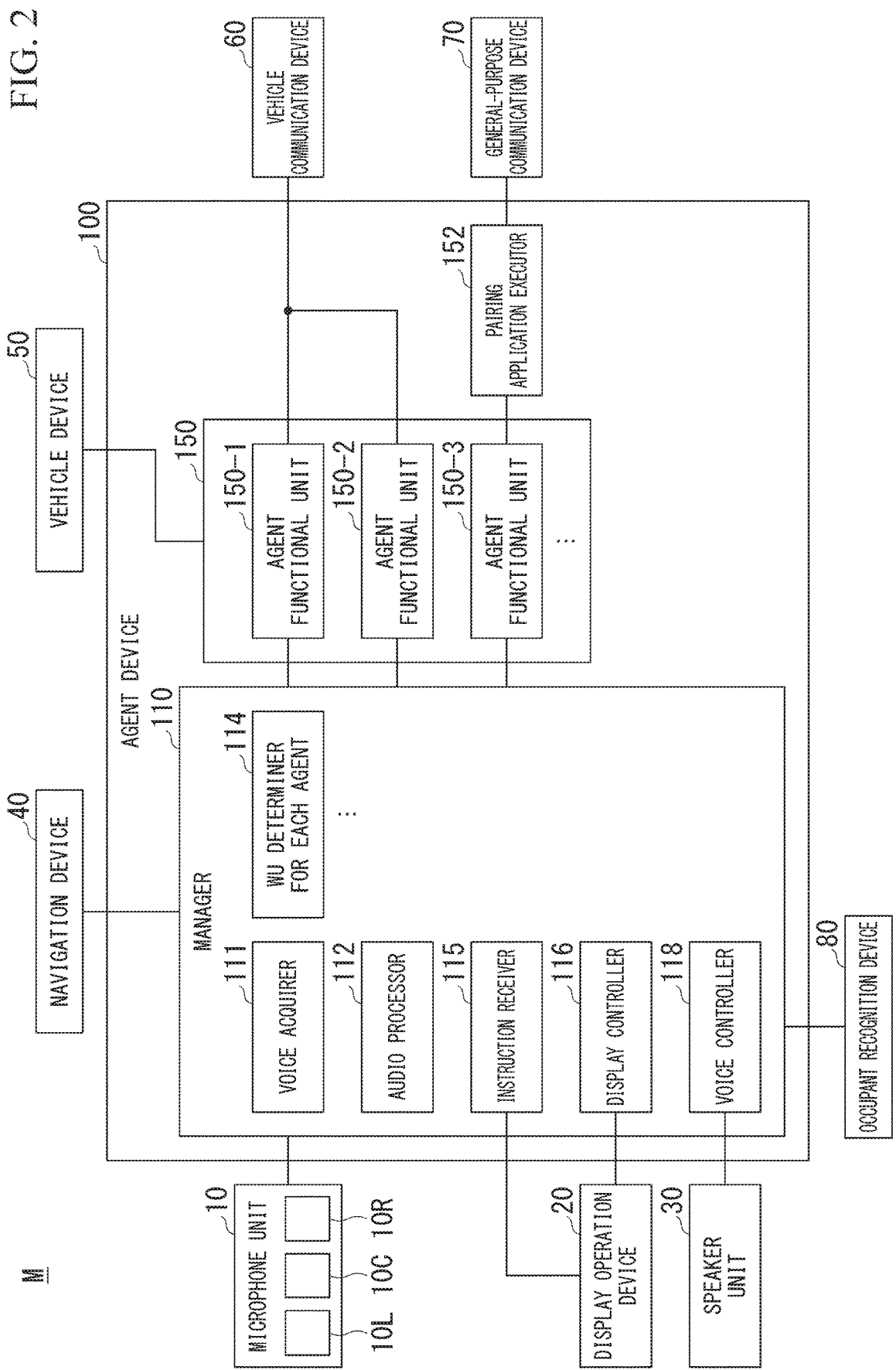
FIG. 2 is a diagram illustrating a configuration of the agent device and devices mounted in a vehicle according to a first embodiment.

FIG. 2 is a diagram illustrating a configuration of the agent device 100 and devices mounted in the vehicle M according to a first embodiment. In the vehicle M, for example, one or more microphone units 10, a display operation device 20 (an example of "display"), a speaker unit 30, a navigation device 40, a vehicle device 50, an in-vehicle communication device 60, an occupant recognition device 80, and the agent device 100 are mounted. A general-purpose communication device 70 such as a smartphone is brought in the vehicle to be used as a communication device in some cases. These devices are connected to each other via a multiplex communication line such as a controller area network (CAN) communication line, a serial communication line, or a wireless communication network. The configuration shown in FIG. 2 is merely exemplary, a part of the configuration may be omitted, and another configuration may be further added.

The microphone unit 10 is a voice collector that collects a voice spoken in the vehicle. The display operation device 20 is a device (or a device group) that can display an image and receive an input operation. The display operation device 20 includes, for example a display device configured as a touch panel. The display operation device 20 may further include a head-up display (HUD) or a mechanical input device. The speaker unit 30 includes, for example, a plurality of speakers (sound outputters) arranged at mutually different positions in the vehicle. The display operation device 20 may be common between the agent device 100 and the navigation device 40. The details thereof will be described later.

The navigation device 40 includes a navigation human machine interface (HMI), a positioning device such as a global positioning system (GPS), a storage device that stores map information, and a control device (a navigation controller) that performs route searching or the like. Some or all of the microphone unit 10, the display operation device 20, and the speaker unit 30 may be used as the navigation HMI. The navigation device 40 searches for a route (navigation route) for movement from a position of the vehicle M specified by the positioning device to a designation input by an occupant and outputs guide information using the navigation HMI so that the vehicle M can travel along the route. A navigation server which can be accessed via the network NW may have the route searching function. In this case, the navigation device 40 acquires the route from the navigation server and outputs the guide information. The agent device 100 may be constructed using the navigation controller as a basis. In this case, the navigation controller and the agent device 100 may be integrated as hardware.

The vehicle device 50 includes, for example, a driving power output device such as an engine or a travel motor, a starting motor of the engine, a door lock device, a door opening or closing device, windows, a window opening and closing device and a window opening and closing control device, seats, a seat position control device, a rearview mirror and an angle position control device for the rearview mirror, vehicle interior and exterior lighting devices, a control device for the vehicle interior and exterior lighting devices, a wiper, a defogger, control devices for the wiper and the defogger, side turn signal lamps and a control device for the side turn signal lamps, an air conditioner, and a vehicle information device for a travel distance, an air pressure of a tire, information regarding a fuel residual amount, and the like.

The in-vehicle communication device 60 is for example, a wireless communication device that can access the network NW using a cellular network or a Wi-Fi network.

The occupant recognition device 80 includes, for example, a seating sensor, a vehicle interior camera, and an image recognition device. The seating sensor includes a pressure sensor provided in a lower portion of a seat and a tension sensor mounted on a seat belt. The vehicle interior camera is a charge coupled device (CCD) camera or a complementary metal oxide semiconductor (CMOS) camera provided inside the vehicle.

The image recognition device analyzes an image of the vehicle interior camera and recognizes presence or absence of an occupant and a face direction or the like of the occupant on each seat. In the embodiment, the occupant recognition device 80 is an example of a seating position recognizer.

Figure 3:
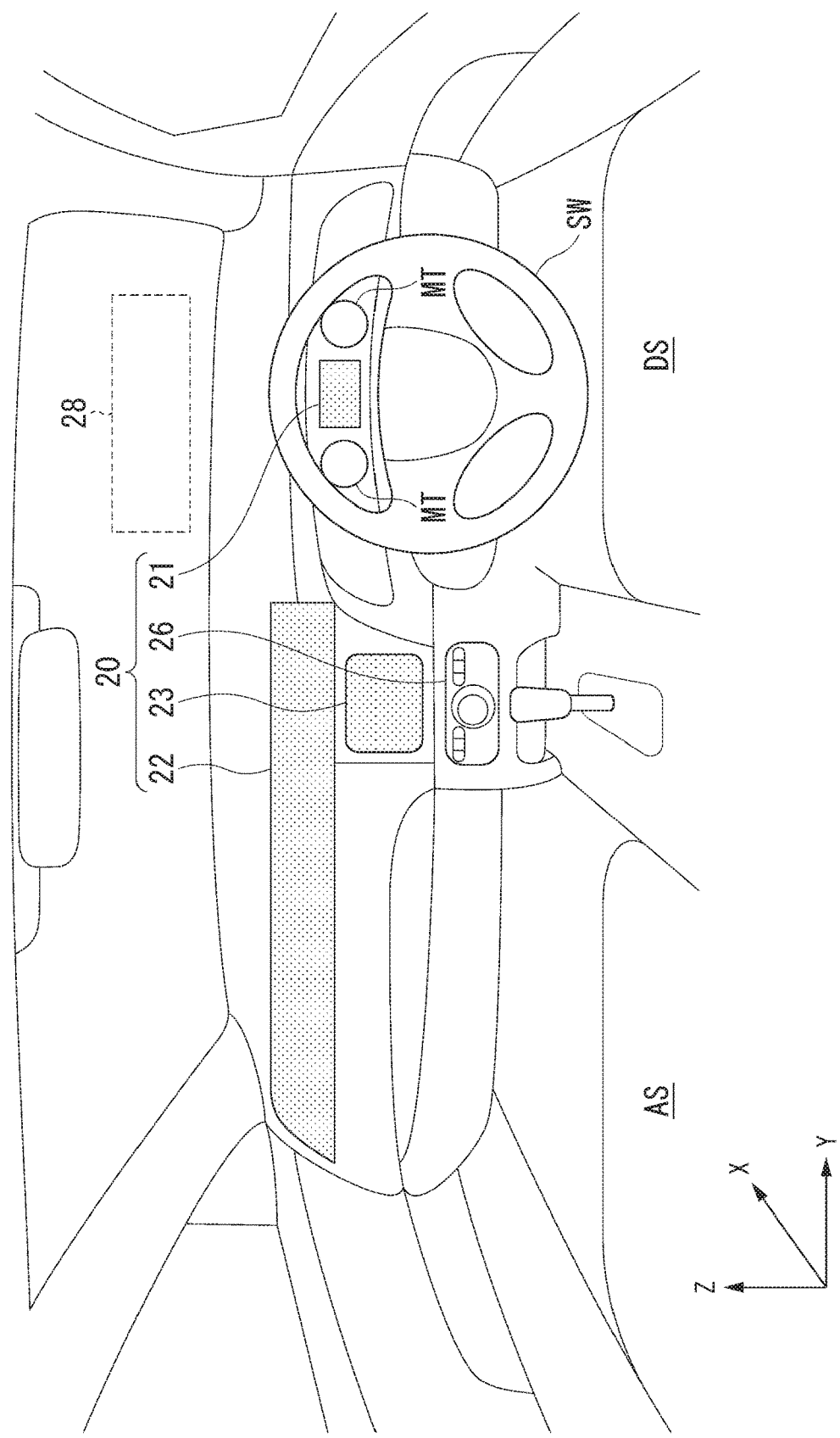
FIG. 3 is a diagram illustrating a disposition example of a display operation device.

FIG. 3 is a diagram illustrating a disposition example of the display operation device 20. The display operation device 20 includes, for example, a first display 21, a second display 22, a third display 23, and an operation switch ASSY 26. The display operation device 20 may further include a HUD 28.

In the vehicle M, for example, there are a driver seat DS in which a steering wheel SW is provided and a passenger seat AS which is provided in a vehicle width direction (in the drawing, the Y direction) with respect to the driver seat DS. The first display 21 is installed near meters MT provided to face the driver seat DS. The second display 22 is a display device that has a horizontally long shape extending from the vicinity of the middle between the driver seat DS and the passenger seat AS in an instrument panel to a position facing the left end of the passenger seat AS. The third display 23 is installed near the middle between the driver seat DS and the passenger seat AS in the vehicle width direction and below the second display 22.

The first display 21 is an example including a first display area and the second display 22 is an example including a second display area. A position of the first display area in the vehicle M is closer to a position at which head of a driver is assumed to be located than the second display area.

For example, the first display 21, the second display 22, and the third display 23 are configured together as touch panels and include a liquid crystal display (LCD), an organic electroluminescence (EL) display, and a plasma display as displays. The operation switch ASSY 26 is an integration of a dial switch, a button type switch, and the like. The display operation device 20 outputs content of an operation performed by an occupant to the agent device 100. Content displayed by the first display 21, the second display 22, and the third display 23 may be determined by the agent device 100.

Figure 4:
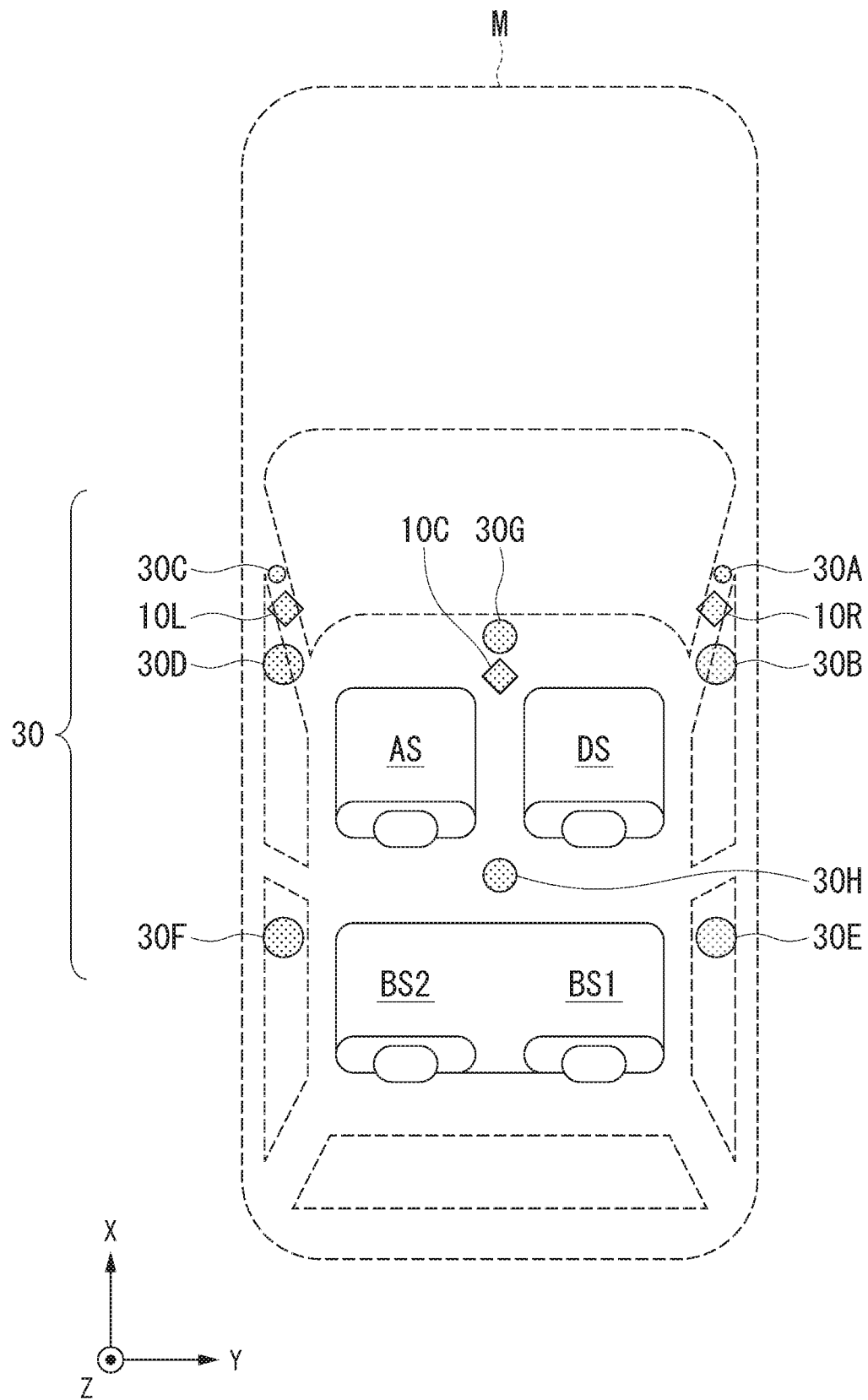
FIG. 4 is a diagram illustrating a disposition example of speaker units.

FIG. 4 is a diagram illustrating a disposition example of speaker units 10 and the speaker unit 30. The microphone unit 10 includes, for example, microphones 10C, 10R, and 10L. The microphone 10C is installed between the driver seat DS and the passenger seat AS. The microphone 10R is installed in a window pillar (so-called A pillar) on the side of the driver seat DS. The microphone 10L is installed in a window pillar on the side of the passenger seat AS.

The speaker unit 30 includes, for example, speakers 30A to 30H. The speaker 30A is provided in a window pillar on the side of the driver seat DS. The speaker 30B is installed in a lower portion of a door close to the driver seat DS. The speaker 30C is installed in a window pillar on the side of the passenger seat AS. The speaker 30D is installed in a lower portion of a door close to the passenger seat AS. The speaker 30E is installed in a lower portion of a door close to the side of a right back seat BS1. The speaker 30F is installed in a lower portion of a door close to the side of a left back seat BS2. The speaker 30G is installed near the second display 22. The speaker 30H is installed on a ceiling (roof) of the vehicle interior.

In the disposition, for example, when only the speakers 30A and 30B are caused to output sounds, a sound image is localized near the driver seat DS. When only the speakers 30C and 30D are caused to output sounds, a sound image is localized near the passenger seat AS. When only the speaker 30E is caused to output a sound, a sound image is localized near the right back seat BS1. When only the speaker 30F is caused to output a sound, a sound image is localized near the left back seat BS2. When only the speaker 30G is caused to output a sound, a sound image is localized near a front side of the vehicle interior. When only the speaker 30H is caused to output a sound, a sound image is localized near the upper side of the vehicle interior. The present invention is not limited thereto and the speaker unit 30 can localize a sound image at any position in the vehicle interior by adjusting distribution of a sound output from each speaker using a mixer or an amplifier.

[Agent Device]

Referring back to FIG. 2, the agent device 100 includes a manager 110, agent functional units 150-1, 150-2, and 150-3, and a pairing application executor 152. The manager 110 includes, for example, a voice acquirer 111, an audio processor 112, a wake-up (WU) determiner 114 for each agent, an instruction receiver 115, a display controller 116, and a voice controller 118. When the agent functional units are not distinguished from each other, the agent functional units are simply referred to as the agent functional units 150. The three agent functional units 150 are merely an example corresponding to the number of agent servers 200 in FIG. 1 and the number of agent functional units 150 may be 2 or 4 or more. The software disposition illustrated in FIG. 2 is simple for description. Actually, for example, the manager 110 may be interposed between the agent functional units 150 and the in-vehicle communication device 60 or may be altered to any position.

Each constituent element of the agent device 100 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as an HDD or a flash memory or may be stored in a detachably mounted storage medium (a non-transitory storage medium) such as a DVD or a CD-ROM so that the storage medium is mounted on a drive device to be installed.

The manager 110 functions when a program such as an operating system (OS) or middleware is executed.

The voice acquirer 111 specifies a seat of an occupant who has spoken based on an output from the microphone unit 10. For example, the voice acquirer 111 determines whether a direction in which a voice is uttered is the driver seat DS or the passenger seat AS based on an output from the microphone unit 10. For example, when the microphone is installed in each of the driver seat DS and the passenger seat AS, the voice acquirer 111 determines a seat from which a volume acquired by the microphone is greater as the seat of the occupant who has spoken. The manager 110 may include a function unit that specifies an occupant who is moving his or her mouth as the occupant speaking based on an image acquired by a camera of the occupant recognition device 80.

The voice acquirer 111 processes a voice of the microphone unit 10, for example, in accordance with each different voice acquisition method in accordance with the seat of the occupant speaking a wakeup word (an example of an occupant activating the agent functional unit 150). The different voice acquisition method means that a space position (or a direction or directivity) of an exclusively voice collecting target is different. For example, the voice acquirer 111 changes the voice acquisition method by switching the microphone adopting the voice in the microphone 10. The voice acquirer 111 may change the voice acquisition method by performing a process such as DBF with respect to a phased array radar. The voice acquirer 111 may change the voice acquisition method by performing control such that the microphone is driven mechanically or electronically to switch ON and OFF of the microphone or performing control such that the direction of the microphone is changed using a swing function of the microphone.

For example, the voice acquirer 111 may change the voice acquisition method in accordance with the seat of an occupant corresponding to an agent when an AG animation is moved between the displays and the occupant talking with the agent is changed irrespective of the seat of the occupant speaking the wakeup word. The switching or the like of the occupant talking with the agent will be described later. For example, when the occupant corresponding to the agent is the occupant on the driver seat DS, the voice of the microphone unit 10 is processed in accordance with a driver seat acquisition method. For example, when the occupant corresponding to the agent is the occupant on the passenger seat AS, the voice of the microphone unit 10 is processed in accordance with a passenger seat acquisition method.

The voice acquisition method may be set arbitrarily in accordance with the number of microphones installed in the vehicle M or the positions of the microphones in the vehicle. For example, when the microphone is in each of the driver seat DS and the passenger seat AS, the voice acquirer 111 turns on the microphone 10R on the side of the driver seat DS and turns off the microphone 10L on the side of the passenger seat AS in the driver seat acquisition method. When the microphone is common to the driver seat DS and the passenger seat AS, the voice acquirer 111 changes directivity.

The process by the voice acquirer 111 may be performed by the WU determiner 114 for each agent or the agent functional unit 150. For example, the WU determiner 114 for each agent or the agent functional unit 150 acquires a speech of an occupant based on an output from the microphone 10 and causes an acquisition method of acquiring a speech of an occupant to differ between a case in which an AG animation is displayed on a driver seat screen and a case in which the AG animation is displayed on a passenger seat screen, as in the above-described voice acquirer 111.

The audio processor 112 of the manager 110 performs audio processing on an input sound so that a wakeup word set in advance for each agent is appropriately recognized.

The WU determiner 114 for each agent is present to correspond to each of the agent functional units 150-1, 150-2, and 150-3 and recognizes a wakeup word determined in advance for each agent. The WU determiner 114 for each agent recognizes a meaning of a voice from the voice subjected to the audio processing (a voice stream). First, the WU determiner 114 for each agent detects a voice section based on a zero-crossing and an amplitude of a voice waveform in the voice stream. The WU determiner 114 for each agent may perform section detection based on voice identification and non-voice identification in units of frames based on a mixed Gaussian mixture model (GMM).

Subsequently, the WU determiner 114 for each agent creates text of a voice in the detected voice section and sets the text as text information. Then, the WU determiner 114 for each agent determines whether the text information of the text corresponds to the wakeup word. When the WU determiner 114 for each agent determines that the text information is the wakeup word, the WU determiner 114 for each agent activates the corresponding agent functional unit 150. A function equivalent to the WU determiner 114 for each agent may be mounted on the agent server 200. In this case, when the manager 110 transmits the voice stream subjected to the audio processing by the audio processor 112 to the agent server 200 and the agent server 200 determines that the text information is the wakeup word, the agent functional unit 150 is activated in response to an instruction from the agent server 200. Each agent functional unit 150 may be normally activated and determine the wakeup word personally. In this case, it is not necessary for the manager 110 to include the WU determiner 114 for each agent.

The agent functional unit 150 causes an agent to be introduced in cooperation with the corresponding agent server 200 and provides a service including a response by a voice in accordance with a speech of an occupant of the vehicle. The agent functional unit 150 may include an agent functional unit to which an authority to control the vehicle device 50 is granted. In the agent functional unit 150, there is an agent functional unit that communicates with the agent server 200 in cooperation with the general-purpose communication device 70 via the pairing application executor 152. For example, an authority to control the vehicle device 50 is granted to the agent functional unit 150-1. The agent functional unit 150-1 communicates with the agent server 200-1 via the in-vehicle communication device 60. The agent functional unit 150-2 communicates with the agent server 200-2 via the in-vehicle communication device 60. The agent functional unit 150-3 communicates with the agent server 200-3 in cooperation with the general-purpose communication device 70 via the pairing application executor 152. The pairing application executor 152 performs pairing with the general-purpose communication device 70 through, for example, Bluetooth (registered trademark) to connect the agent functional unit 150-3 to the general-purpose communication device 70. The agent functional unit 150-3 may be connected to the general-purpose communication device 70 through the wired communication using a universal serial bus (USB) or the like. Hereinafter, an agent caused to appear by the agent functional unit 150-1 and the agent server 200-1 in cooperation is referred to as Agent 1, an agent caused to appear by the agent functional unit 150-2 and the agent server 200-2 in cooperation is referred to as Agent 2, and an agent caused to appear by the agent functional unit 150-3 and the agent server 200-3 in cooperation is referred to as Agent 3 in some cases.

The agent functional unit 150 provides an agent function based on, for example, a subsequent speech of the occupant speaking the wakeup word. When the agent correspondence is transferred from the occupant speaking the wakeup word to another occupant, a service is provided based on a speech of the occupant to which the agent correspondence is transferred. The agent correspondence includes, for example, talking with the agent.

The instruction receiver 115 receives an instruction from an occupant using the display operation device 20. For example, the instruction receiver 115 receives an instruction from an occupant based on an output from a detector integrated with the first display 21 and an output from a detector integrated with the second display 22. The present invention is not limited thereto and the instruction receiver 115 may have a voice recognition function and receive an instruction from an occupant by recognizing a meaning of a voice based on a voice inside the vehicle. The voice inside the vehicle includes a sound input from the microphone unit 10 and a voice subjected to the audio processing by the audio processor 112 (a voice stream).

The display controller 116 causes the first display 21, the second display 22, or the third display 23 to display an image or a moving image in response to an instruction from the agent functional unit 150.

Hereinafter, the display controller 116 is assumed to generate an image of a driver seat screen and an image of a passenger seat screen, cause the first display 21 to display the image of the driver seat screen, and cause the second display 22 to display the image of the passenger seat screen in accordance with an instruction from the agent functional unit 150. The image of the driver seat screen and the image of the passenger seat screen will be described later. The display controller 116 generates, for example, an animation of a personified agent that communicates with an occupant inside the vehicle (hereinafter referred to as an AG animation) as a part of a passenger seat image or a driver seat image and causes one of the first display 21 and the second display 22 to display the generated AG animation. For example, the display controller 116 causes the AG animation to be displayed on a seat screen of an occupant speaking a wakeup word.

The AG animation is, for example, an animation representing a character of an agent, an icon of an agent, or the like. The AG animation is, for example, an image or a moving image configured such that a person or a personified character talks with an occupant. The AG animation may include, for example, a facial image that has an expression or a facial direction recognized by at least an observer (an occupant). For example, the AG animation may be an animation in which a part imitating eyes or a noise in a facial area is expressed and an expression or a facial direction is recognized based on the position of the part in the facial area. The AG animation may be an animation which is felt stereoscopically, in which a head image in a 3-dimensional space is included so that a facial direction of an agent is recognized by an observer, and in which an image of a body (a trunk or limbs) is included so that an action (a motion or a behavior), a posture, or the like of the agent is recognized.

For example, the display controller 116 causes the first display 21 or the second display 22 to display the AG animation during a period in which the agent functional unit 150 is activated. The display controller 116 may cause an action of the AG animation to differ in response to a speech of an occupant. For example, when the AG animation is caused to perform a small action and the agent performs a process in response to a speech of the occupant during waiting for the agent, the display controller 116 may cause the AG animation to perform an action in response to the performed process.

The voice controller 118 causes some or all of the speakers included in the speaker unit 30 to output voices in response to an instruction from the agent functional unit 150. The voice controller 118 may perform control such that a sound image of an agent voice is localized at a position corresponding to a display position of the AG animation by using the plurality of speaker units 30. The position corresponding to the display position of the AG animation is, for example, a position at which the occupant is predicted to feel that the AG animation speaks the agent voice and, specifically, a position near the display position of the AG animation (for example, within 2 to 3 [cm]). The localization of the sound image is, for example, determination of a spatial position of a sound source felt by an occupant by adjusting the volume of a sound which is delivered to the right and left ears of the occupant.

[Agent Server]

Figure 5:
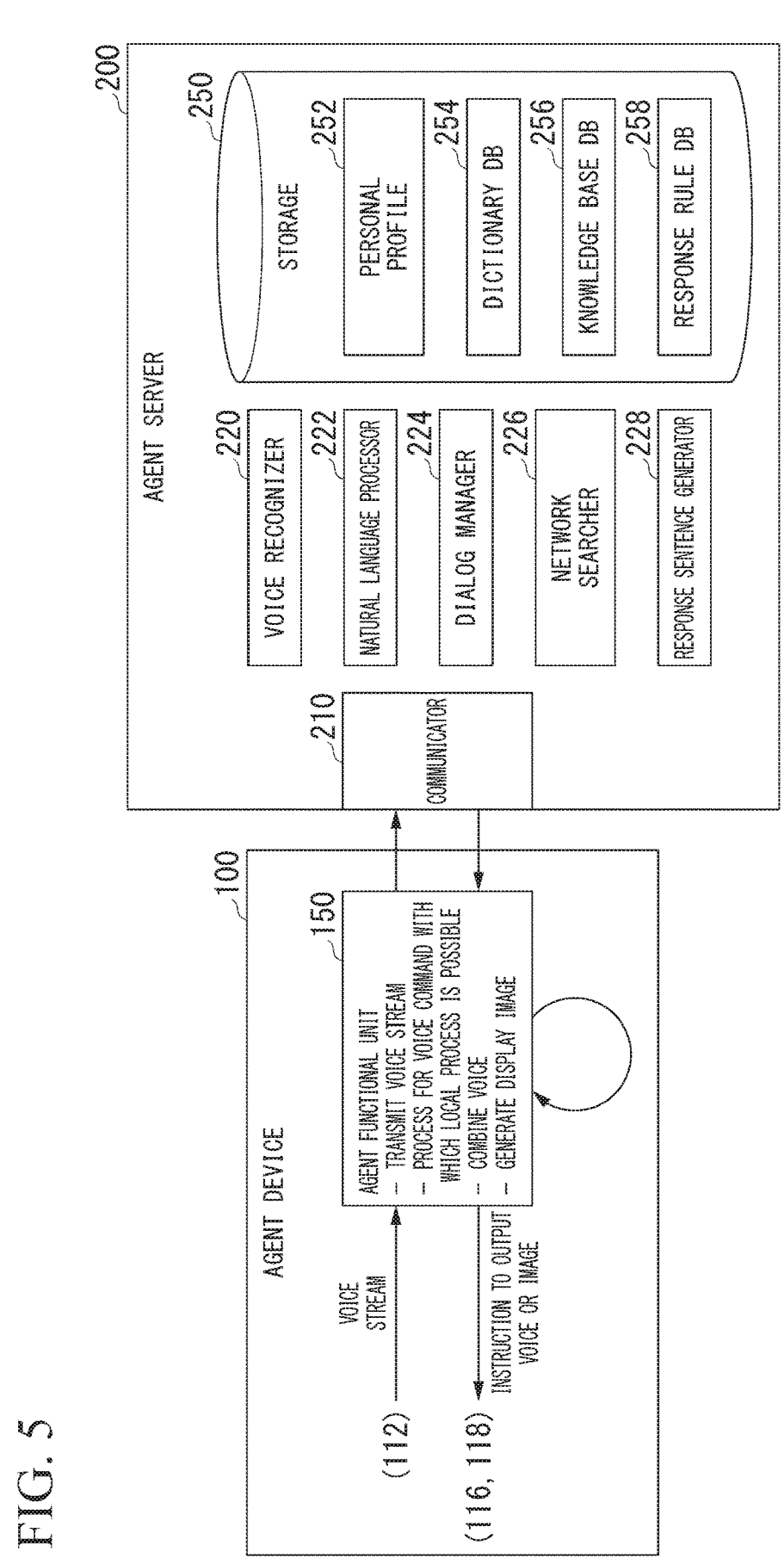
FIG. 5 is a diagram illustrating a configuration of an agent server and a part of a configuration of an agent device.

FIG. 5 is a diagram illustrating a configuration of an agent server 200 and a part of a configuration of the agent device 100. Hereinafter, a configuration of the agent server 200 and an operation of the agent functional unit 150 and the like will be described. Here, description of physical communication from the agent device 100 to the network NW will be omitted.

The agent server 200 includes a communicator 210. The communicator 210 is, for example, a network interface such as a network interface card (NIC). The agent server 200 further includes, for example, a voice recognizer 220, a natural language processor 222, a dialog manager 224, a network searcher 226, and a response sentence generator 228. These constituent elements are realized, for example, by causing a hardware processor such as a CPU to execute a program (software). Some or all of these constituent elements may be realized by hardware (a circuit unit including circuitry) such as an LSI, an ASIC, an FPGA, or a GPU or may be realized by software and hardware in cooperation. The program may be stored in advance in a storage device (a storage device including a non-transitory storage medium) such as an HDD or a flash memory or may be stored in a detachably mounted storage medium (a non-transitory storage medium) such as a DVD or a CD-ROM so that the storage medium is mounted on a drive device to be installed.

The agent server 200 includes a storage 250. The storage 250 is realized by any of the foregoing various storage devices. The storage 250 stores data or programs such as a personal profile 252, a dictionary database (DB) 254, a knowledge base DB 256, and a response rule DB 258.

In the agent device 100, the agent functional unit 150 transmits the voice stream or a voice stream subjected to a process such as compression or encoding to the agent server 200. When a voice command with which a local process is possible (a process not involved with the agent server 200) is recognized, the agent functional unit 150 may perform a process requested with a voice command. The voice command with which the local process is possible is a voice command which can be responded by referring to a storage (not illustrated) included in the agent device 100 or a voice command (for example, a command to turn on an air conditioner) to control the vehicle device 50 in the case of the agent functional unit 150-1. Accordingly, the agent functional unit 150 may have some of the functions included in the agent server 200.

When the voice stream is acquired, the voice recognizer 220 performs voice recognition and outputs text information of text, and the natural language processor 222 interprets a meaning of the text information while referring to the dictionary DB 254. In the dictionary DB 254, abstracted meaning information of the text information is associated. The dictionary DB 254 may include list information of synonyms. A process of the voice recognizer 220 and a process of the natural language processor 222, are not clearly separated in stages and may influence each other such that the voice recognizer 220 corrects recognition results when receiving processing results of the natural language processor 222.

For example, when a meaning such as "Today's weather" or "How is the weather" is recognized as a recognition result, the natural language processor 222 generates a command for being replaced by standard text information "Today's weather." Thus, even when a variation in text occurs in a voice of a request, a dialog for the request can be facilitated. For example, the natural language processor 222 may recognize a meaning of text information using artificial intelligence processing such as a machine learning process in which a probability is used or may generate a command based on a recognition result.

The dialog manager 224 determines content of a speech to an occupant of the vehicle M while referring to the personal profile 252, the knowledge base DB 256, and the response rule DB 258 based on a processing result (a command) of the natural language processor 222. The personal profile 252 includes personal information, interests and preferences, a history of past dialogs, and the like of the occupant stored for each occupant. The knowledge base DB 256 is information that regulates relevance of things. The response rule DB 258 is information that regulates operations which an agent is to perform in response to commands (responses, content of device control, and the like).

The dialog manager 224 may specify an occupant by comparing with the personal profile 252 using feature information obtained from a voice stream. In this case, in the personal profile 252, for example, personal information is associated with feature information of a voice. The feature information of the voice is, for example, information regarding features of a manner of talking such as a pitch, intonation, rhythm (a pattern of sound tone), and the like of a voice or a feature amount according to a Mel Frequency Cepstrum Coefficients or the like. The feature information of the voice is, for example, information obtained by causing an occupant to speak predetermined words, sentences, or the like at the time of initial registration of the occupant and recognizing the spoken voices.

The dialog manager 224 causes the network searcher 226 to perform searching when a command requests information searchable for via the network NW. The network searcher 226 accesses the various web servers 300 via the network NW to acquire desired information. The "information searchable for via the network NW" is, for example, an evaluation result by a general user of a restaurant near the vehicle M or weather forecast in accordance with the position of the vehicle M on that day.

The response sentence generator 228 generates a response sentence and transmits the response sentence to the agent device 100 so that the content of the speech determined by the dialog manager 224 is delivered to the occupant of the vehicle M. When the occupant is an occupant registered in the personal profile, the response sentence generator 228 may call the name of the occupant or generate a response sentence in a manner of speaking imitating a manner of speaking of the occupant.

When the response sentence is acquired, the agent functional unit 150 instructs the voice controller 118 to perform voice combination and output a voice. The agent functional unit 150 instructs the display controller 116 to display the AG animation in accordance with the voice output. In this way, an agent function in which the virtually appearing agent responds to the occupant of the vehicle M is realized.

[Display Control]

The display controller 116 causes the first display 21 and the second display 22 to display a service provided by the agent functional unit 150 or information regarding the agent or the like.

For example, the display controller 116 causes either one of the first display 21 and the second display 22 to display the AG animation based on the position of a speaking occupant in the vehicle. For example, the display controller 116 causes the display associated in advance with each seat to display the AG animation in accordance with a seat of an occupant talking with the agent (hereinafter referred to as an AG user) between the first display 21 and the second display 22. For example, the first display 21 corresponds to the driver seat DS in advance and the second display 22 corresponds to the passenger seat AS in advance.

The AG user may be, for example, an occupant speaking a wakeup word or may be an occupant to which the agent correspondence is transferred from the occupant speaking the wakeup word. The agent correspondence can be transferred with movement of the AG animation, for example, by moving the AG animation to another display. For example, when the wakeup word is spoken from the driver seat DS, the AG user is an occupant on the driver seat DS.

The display controller 116 moves the AG animation between the first display 21 and the second display 22 in response to a movement instruction from an occupant.

For example, the movement instruction from the occupant is acquired by the instruction receiver 115 and is output to the display controller 116. The movement instruction from the occupant includes, for example, a touch operation or a flick operation on the AG animation displayed on the first display 21 or the second display 22. The touch operation on the AG animation may be, for example, an operation of touching a portion in which the AG animation is displayed or may be an operation of touching a button or the like receiving the movement instruction from the occupant. The flick operation on the AG animation may be, for example, an operation of brushing away from a portion in which the AG animation is displayed or may be an operation of brushing away from over the entire display surface of the display.

The present invention is not limited thereto and the movement instruction from the occupant may be acquired by the instruction receiver 115 through voice recognition or may be acquired by the instruction receiver 115 based on an output from the occupant recognition device 80. The former case includes, for example, recognition cases of voices such as "Move agent to passenger seat," "Transfer agent to passenger seat," or "Release agent temporarily." The latter case includes, for example, a case in which an operation in which an occupant brushes away with her or his finger is recognized based on an image obtained by imaging the vehicle interior.

The instruction receiver 115 may receive a direction in which the AG animation is moved based on a flick operation on the AG animation. For example, when an occupant on the driver seat DS performs a flick operation of brushing away from the AG agent displayed on the first display 21 toward the passenger seat AS, the instruction receiver 115 receives movement from the first display 21 to the second display 22. The present invention is not limited to this example. When a flick operation is performed toward the third display 23, the instruction receiver 115 may receive movement from the first display 21 to the third display 23. When a display is installed in a back seat and a flick operation is performed on the screen upward or downward, the instruction receiver 115 may receive movement from the first display 21 to the display of the back seat.

The display controller 116 may cause the display operation device 20 to display agent information provided in response to a speech of an occupant. The agent information includes, for example, a recommendation list which the agent recommends to the occupant and a search result or the like searched for using a search engine based on a condition requested by the occupant.

The display controller 116 may cause display the agent information on both the first display 21 and the second display 22. In this case, the display controller 116 may cause a display type of the agent information to differ between a case in which the agent information is displayed in a display area in which the AG animation is displayed and a case in which the agent information is displayed in a display area in which the AG animation is not displayed. For example, the display controller 116 reduces an information amount of the agent information when the agent information is displayed in the display area in which the AG animation is displayed than when the agent information is displayed in the display area in which the AG animation is not displayed.

When the agent correspondence is transferred to another occupant with movement of the AG agent to another display, the display controller 116 changes the display type of the agent information. For example, when the AG agent is moved from the driver seat screen to the passenger seat screen, the display controller 116 causes the agent display to be displayed on the passenger seat screen on which the agent information has not been displayed so that the agent information which has been displayed on the driver seat screen is not displayed. That is, the display controller 116 changes the information amount of the agent information between before and after the movement of the AG animation.

[Voice Acquisition Control]

The WU determiner 114 for each agent and the agent functional unit 150 change the voice acquisition method in response to movement of the AG animation. In other words, when the AG agent is moved to another display to transfer the agent correspondence to another occupant (that is, the AG user is switched), the WU determiner 114 for each agent and the agent functional unit 150 also switch the voice acquisition method to an acquisition method of acquiring a voice of an occupant corresponding to the agent. The voice acquisition method may be changed by the voice acquirer 111.

Hereinafter, an example in which the agent functional unit 150 changes the voice acquisition method will be described. For example, when an occupant speaking a wakeup word is an occupant on the driver seat DS, the AG user is the occupant on the driver seat DS and the display displaying the AG animation is the first display 21. When the AG user is the occupant on the driver seat DS, the agent functional unit 150 determines the voice acquisition method as a driver seat acquisition method. The voice acquirer 111 processes a voice in accordance with the driver seat acquisition method. Then, a touch operation on the AG animation is assumed to be performed by the occupant on the driver seat DS. In this case, the AG agent is moved from the first display 21 to the second display 22 and the agent functional unit 150 changes the voice acquisition method from the driver seat acquisition method to a passenger seat acquisition method. The voice acquirer 111 processes a voice in accordance with a passenger seat acquisition method.

Figure 6:
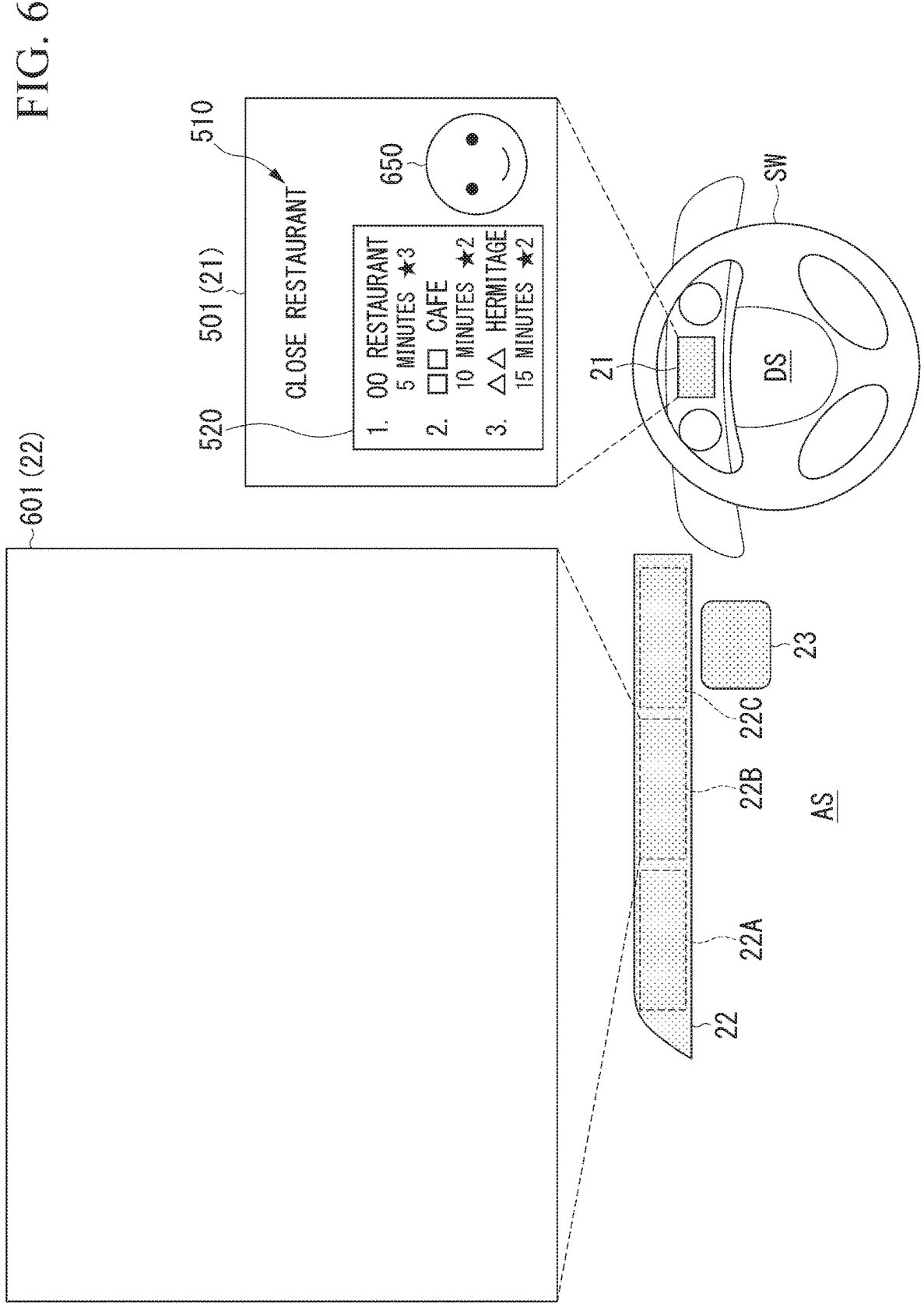
FIG. 6 is a diagram illustrating an example of a screen when an AG user is an occupant of a driver seat.

[Screen Example 1] FIG. 6 is a diagram illustrating an example of a screen when an AG user is an occupant on the driver seat DS. The first display 21 displays a driver seat screen 501 and the second display 22 displays a passenger seat screen 601. A service title 510, a recommendation list 520, and an AG animation 550 are displayed on the driver seat screen 501. The passenger seat screen 601 is in a blank state in which no recommendation list and no AG animation is displayed. Here, an example in which the agent functional unit 150-1 accesses the various web servers 300 via the network NW, acquires recommendation information in response to a request from an occupant, and provides a recommendation service that provides the acquired recommendation information to the occupant in cooperation with the agent server 200-1 will be described. When the occupant selects one piece of recommendation information as a destination, the agent functional unit 150-1 may control the vehicle device 50 such that the vehicle M travels toward the selected destination.

Figure 7:
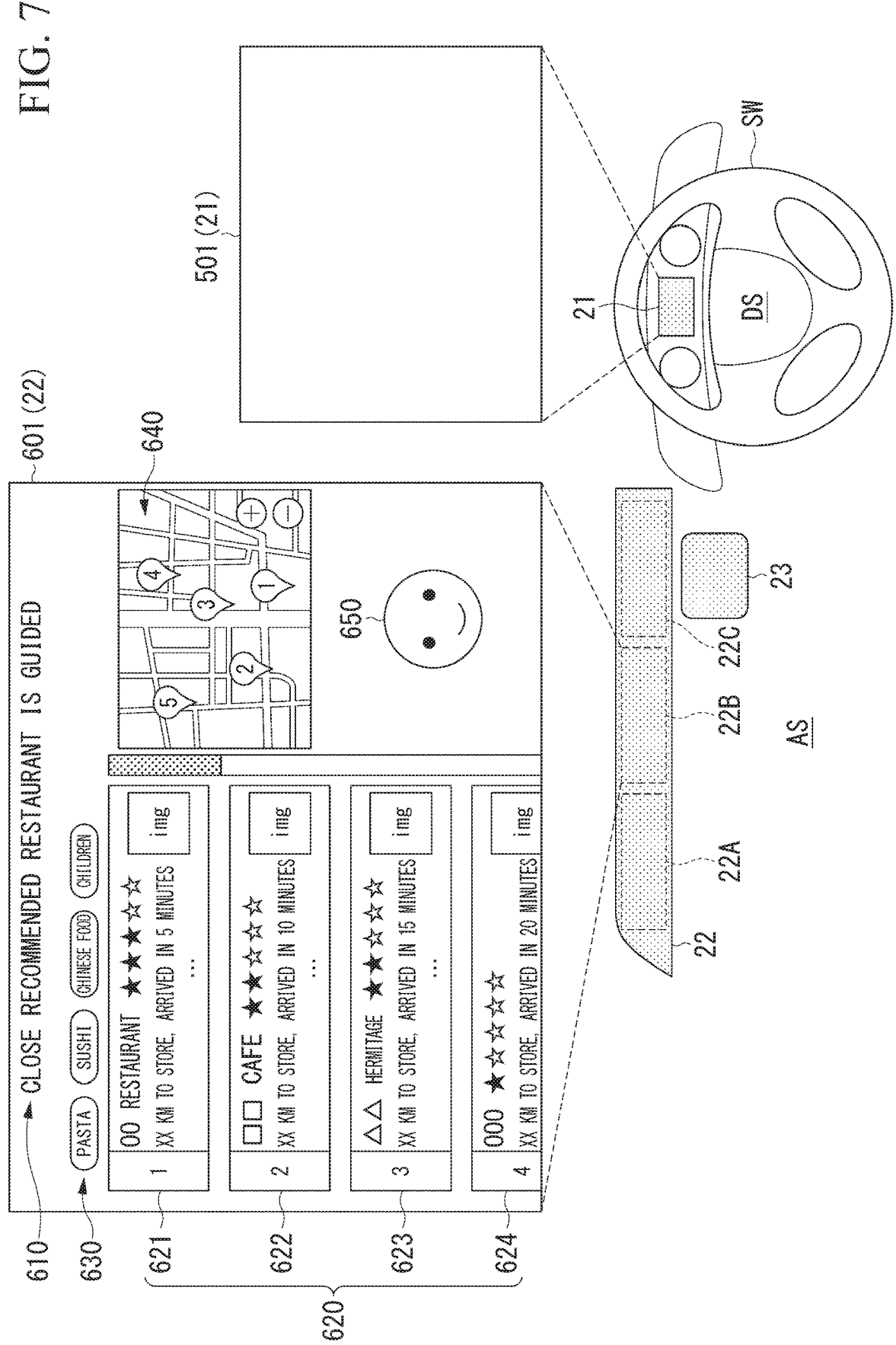
FIG. 7 is a diagram illustrating an example of a screen when the AG user is an occupant of a passenger seat.

FIG. 7 is a diagram illustrating an example of a screen when the AG user is an occupant of a passenger seat. A service title 610, a recommendation list 620, a restriction condition 630, a surrounding map 640, and an AG animation 650 are displayed on the passenger seat screen 601. The driver seat screen 501 is in a blank state in which no recommendation list nor AG animation is displayed.

The service titles 510 and 610 indicate an overview of a service provided by the agent functional unit 150-1. The recommendation lists 520 and 620 indicate a part of the recommendation information acquired by the agent functional unit 150-1. The recommendation lists 520 and 620 include, for example, information regarding restaurants near the vehicle M. The recommendation list 620 include a plurality of recommendation elements 621, 622, 623, 624, . . . and information regarding each restaurant is summarized for each recommendation element.

The restriction condition 630 indicates a condition in which information displayed in the recommendation list 620 is narrowed down (restricted). The surrounding map 640 indicates the position of each restaurant included in the recommendation list 520. The AG animations 550 and 650 are an animation of an agent corresponding to the agent functional unit 150-1. Here, the agent corresponding to the agent functional unit 150-1 is, for example, an animation that has an appearance of such as a personified round ball.

In the service title 510, the number of displayed texts is less than in the service title 610. The service title 510 expresses a service provided by the agent in a word and the service title 610 expresses a service provided by the agent in a polite sentence. In this way, the occupant on the driver seat DS can predict content of displayed information in a short time, and thus it is possible to prevent the occupant on the driver seat DS from looking at the display.

In the recommendation list 520, the number of displayed texts or an amount of displayed information is less than in the recommendation list 620. In the recommendation list 520, for example, names of the restaurants, times necessary to reach the restaurants, and evaluations of the restaurants are displayed. The recommendation list 620 may include, for example, distances to the restaurants, business hours of the restaurants, reviews of the restaurants, prices, and images in addition to the names of the restaurants, the times necessary to reach the restaurants, and the evaluations of the restaurants. As well as a difference in the number of display items, display of information displayed in both the recommendation lists 520 and 620 may differ. For example, the evaluations of the restaurants are expressed by the number of stars by star illustrations in the recommendation list 620 and are expressed by the number of stars by numbers in the recommendation list 520. In this way, the occupant on the driver seat DS can obtain simple information regarding the surrounding restaurants. It is possible to prevent the occupant on the driver seat DS from looking at the display to see more displayed information.

The display controller 116 may cause a display type to differ by displaying the restriction condition 630 or the surrounding map 640 on only the second display 22 and not displaying the restriction condition 630 or the surrounding map 640 on the first display 21. By displaying the restriction condition 630 on the second display 22, the instruction receiver 115 can receive an instruction to restrict conditions from an occupant on the passenger seat AS and further narrow down the information displayed in the recommendation list 620. The occupant on the passenger seat AS can operate the restriction condition 630 according to wishes of the occupant on the passenger seat AS or in accordance with an instruction from the occupant on the driver seat DS. The display controller 116 prevents the occupant on the driver seat DS from inputting an instruction for the agent by performing a manual operation by not displaying the restriction condition 630 on the first display 21. By displaying the surrounding map 640 on only the second display 22, it is possible to prevent the occupant on the driver seat DS from looking at the detailed map. The instruction to restrict the conditions is not limited to reception of the second display 22 and may be received using a voice recognition function by the instruction receiver 115. Even in this case, the occupant on the passenger seat AS can see and check the restriction condition 630 and gives an instruction to restrict the conditions, and thus it is possible to improve convenience.

The display controller 116 may cause the AG animation to perform an action in response to a speech of the occupant. Examples of the action include a motion, a behavior, and an expression. For example, when the occupant waits for speaking, the AG animation may perform an action as if the AG animation were waiting quietly. When information is searched for in response to the speech of the occupant, the AG animation may take an action as if the AG animation were searching for something with a magnifying glass.

[Screen Example 2]

Figure 8:
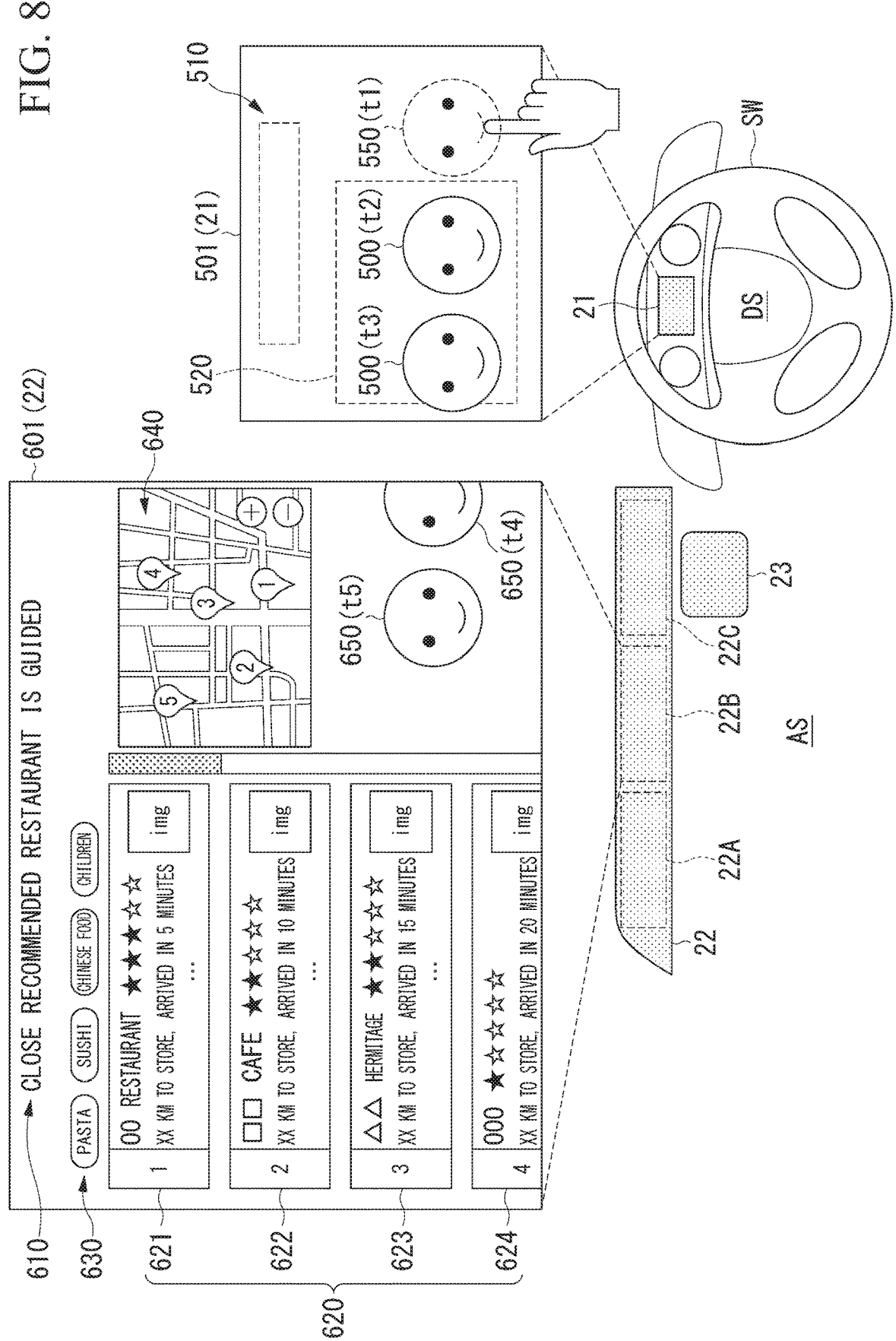
FIG. 8 is a diagram illustrating an example of a screen while an AG animation is moving and after the AG animation moves.

FIG. 8 is a diagram illustrating an example of a screen while an AG animation is moving and after the AG animation moves. Here, an example in which the AG user is an occupant on the driver seat DS in a state before movement will be described. In the state before movement, the image illustrated in FIG. 6 is displayed on the first display 21. An AG animation 550 (t1) illustrated in FIG. 8 is an AG animation before movement. Here, tx indicates a time, t1 indicates furthest in the past, and t5 indicates furthest in the future. For example, when the AG animation 550 (a) is touched by the occupant on the driver seat DS, AG animations 550 (t2) and 550 (t3) are displayed in sequence. Then, when the AG animation 550 (t3) disappears from the first display 21, the AG animation is moved to the second display 22 and AG animations 650 (t4) and 650 (t5) are displayed in sequence. In this way, the display controller 116 can display an animation in the middle of the movement of the AG animation from the first display 21 to the second display 22. The display controller 116 causes the second display 22 to display agent information illustrated in FIG. 7 with the movement of the AG animation.

In this way, the occupant on the driver seat DS can transfer a role of talking with the agent to the occupant on the passenger seat AS. Therefore, instead of the occupant on the driver seat DS, the occupant on the passenger seat AS can talk with the agent or check the agent information. Even when the occupant does not ride on the passenger seat AS, the AG animation or the agent information is not displayed on the first display 21 by releasing the agent temporarily on the second display 22, and then the agent does not speak to the occupant on the driver seat DS. Thus, it is possible to create an environment in which the occupant on the driver seat DS focuses on driving. The agent functional unit 150 can also be stopped when the occupant desires to focus on driving. However, in the case of re-activation, the occupant has to begin the speech which the occupant has already made, such as the speech of the wakeup word, and thus may feel troublesome. However, this time and effort can be omitted.

Figure 9:
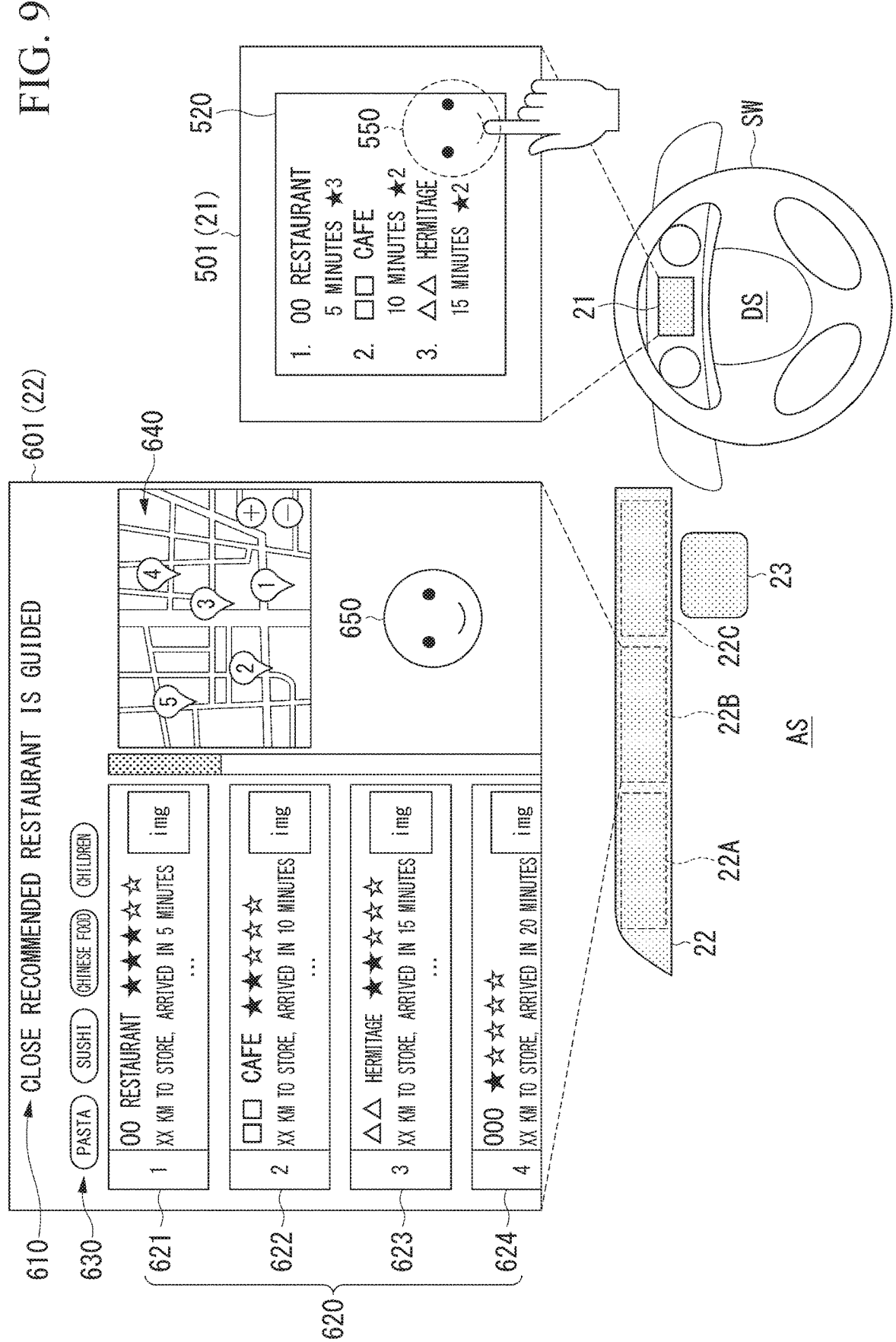
FIG. 9 is a diagram illustrating an example of a screen after the AG animation moves.

[Screen Example 3] FIG. 9 is a diagram illustrating an example of a screen after the AG animation moves. The movement of the AG animation herein is also movement from the first display 21 to the second display 22 similarly to the example illustrated in FIG. 8. Hereinafter, differences from the example of FIG. 8 will be described. The display controller 116 moves the AG animation and causes the first display 21 to display an overview of agent information in a state in which the AG animation 550 is not displayed on the first display 21. Thus, the occupant on the driver seat DS can also check the agent information while assigning the talk with the agent to the occupant on the passenger seat AS. In the example of FIG. 9, the overview of the agent information is displayed on the first display 21, but the details of the agent information may be displayed on the first display 21.

[Screen Example 4]

When a part of the agent information displayed on the second display 22 is designated by the occupant on the passenger seat AS using the display operation device 20, the display controller 116 may change display of the first display 21 to information which is based on the part of the agent information designated by the occupant on the passenger seat AS. The designation of the part of the agent information may be received using a voice recognition function by the instruction receiver 115.

Figure 10:
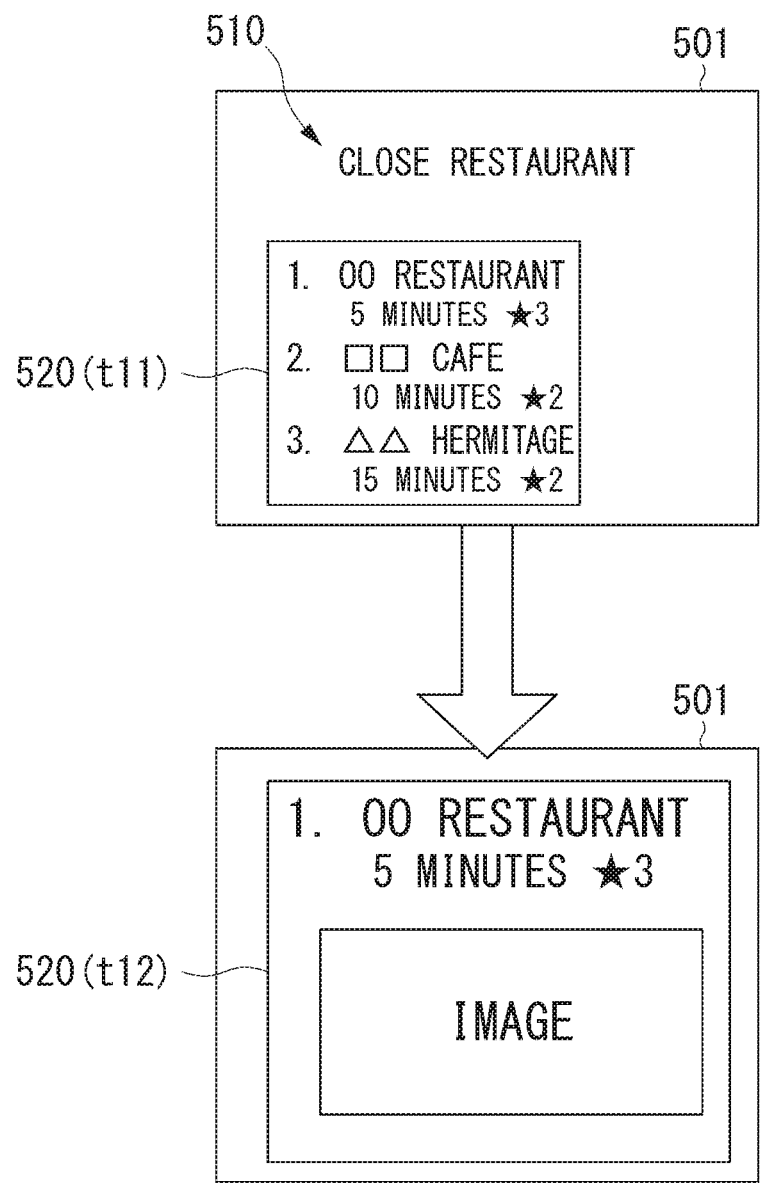
FIG. 10 is a diagram illustrating a screen example of a first display.

FIG. 10 is a diagram illustrating a screen example of the first display 21. The recommendation list 520 (t11) has the same as the display type illustrated in FIG. 9. Here, the AG user is the occupant on the passenger seat AS and the AG animation is displayed on the second display 22. For example, when the recommendation element 621 (see FIG. 9) displayed on the second display 22 is touched by the occupant on the passenger seat AS, the instruction receiver 115 receives a designation of the recommendation element 621 and notifies the display controller 116 that the designation of the recommendation element 621 has been received. The display controller 116 causes the first display 21 to display information regarding a restaurant corresponding to the recommendation element 621. For example, the display controller 116 causes the first display 21 to display the recommendation list 520 (t12) illustrated in FIG. 10.

The recommendation list 520 (t12) includes the name of the restaurant, a necessary time to the restaurant, an evaluation of the restaurant, and an image with regard to the restaurant corresponding to the recommendation element 621. That is, when one recommendation element displayed on the second display 22 is selected by the occupant, the display controller 116 reduces the number of recommendation elements displayed in the recommendation list 520. Accordingly, the display controller 116 can cause the size of text displayed in the recommendation list 520 (t12) to be larger than in the recommendation list 520 (t11) and can cause an image not displayed in the recommendation list 520 (t11) to be displayed in the recommendation list 520 (t12). Thus, the occupant on the driver seat DS can easily see information regarding the restaurant selected by the occupant on the passenger seat AS, and it is possible to prevent the occupant on the driver seat DS from looking at the display compared to a screen on which it is hard to see text or the like since a lot of fine text or the like is displayed. The occupant on the passenger seat AS requests the occupant on the driver seat DS to agree to go to the restaurant which the occupant on the passenger seat AS is interested in.

The present invention is not limited thereto and the first display 21 may be in a blank state in which the recommendation list or the like is not displayed before the recommendation list 520 (t12) is displayed.

[Screen Example 5]

The display controller 116 may move the AG animation between the first display 21 and the second display 22 depending on a driving situation of the vehicle M. In this case, the above-described processes when the AG animation is moved may be performed. For example, the method of acquiring the display type of the agent information or the voice may be changed with the movement of the AG animation.

For example, when a driving situation of the vehicle M satisfies a first condition, the display controller 116 moves the AG animation from the first display 21 to the second display 22. Examples of the first condition include turning of a curve, a speed per hour equal to or greater than a threshold, traveling in a highway, traveling in a residential area, changing of a lane, passing of a front vehicle, and a changing of a destination.

When the driving situation of the vehicle M satisfies a second condition (or when the driving situation of the vehicle M does not satisfy the first condition), the display controller 116 moves the AG animation from the second display 22 to the first display 21. Examples of the second condition include running in a straight line after turning a curve, a speed per hour equal to or greater than a threshold, and getting in a highway.

Thus, when the driving situation of the vehicle M satisfies the first condition, the AG animation can be moved to the passenger seat screen 601 irrespective of an operation by a driver and an occupant talking with an agent can be automatically switched to an occupant on the passenger seat AS. Accordingly, it is possible to provide an environment in which the occupant on the driver seat DS focuses on driving without being distracted to the AG animation 550 or the like displayed on the driver seat screen 501. When the occupant on the passenger seat AS notices the AG animation displayed on the passenger seat screen 601, the occupant can recognize that a driving situation satisfies a predetermined condition and refrain from an action such as speaking to the occupant on the driver seat DS. Accordingly, it is possible to create an environment in which the occupant on the driver seat DS focuses on driving. When the first condition is satisfied and the second condition is then satisfied (or the first condition is not satisfied), the AG animation is returned to the driver seat screen 501 so that the occupant talking with the agent can automatically be switched to the occupant on the driver seat DS, and thus it is possible to improve convenience.

[Voice Control]

The voice controller 118 may change a position to which a sound image of an agent voice is localized in accordance with the movement of the AG animation between the first display 21 and the second display 22. For example, when the AG animation is moved from the first display 21 to the second display 22, the voice controller 118 performs control such that the sound image is localized to a position at which the occupant on the passenger seat AS feels as if the AG animation displayed on the second display 22 were speaking an agent voice. On the other hand, when the AG animation is moved from the second display 22 to the first display 21, the voice controller 118 performs control such that a sound image is localized to a position at which the occupant on the driver seat DS is predicted to feel as if the AG animation displayed on the first display 21 were speaking an agent voice.

Figure 11:
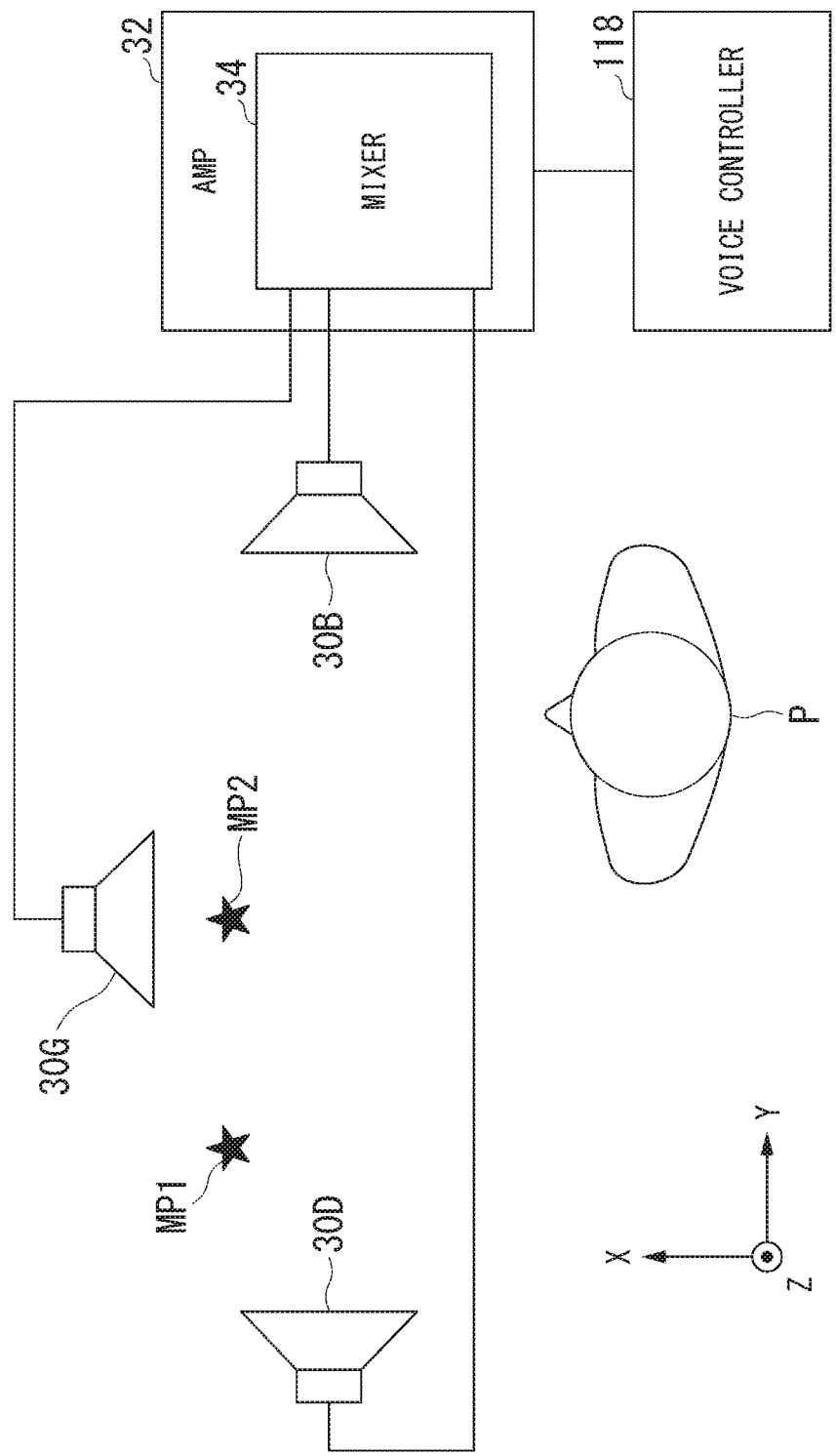
FIG. 11 is a diagram illustrating a principle for determining a position at which a sound image is localized.

FIG. 11 is a diagram illustrating a principle for determining a position at which a sound image is localized. To facilitate the description, FIG. 11 illustrates an example in which the above-described speakers 30B, 30D, and 30G are used, but any speaker included in the speaker unit 30 may be used. The voice controller 118 may localize a sound image by controlling an amplifier (AMP) 32 and a mixer 34 connected to each speaker. For example, when a sound image is localized to a spatial position MP1 illustrated in FIG. 11, the voice controller 118 causes the speaker 30B to output 5% of maximum intensity, causes the speaker 30D to output 80% of maximum intensity, and causes the speaker 30G to output 15% of maximum intensity by controlling the amplifier 32 and the mixer 34. As a result, from the position of the occupant P, the occupant P can feel as if the sound image were localized to the spatial position MP1 illustrated in FIG. 11.

When a sound image is localized to a spatial position MP2 illustrated in FIG. 11, the voice controller 118 causes the speaker 30B to output 45% of the maximum intensity, causes the speaker 30D to output 45% of the maximum intensity, and causes the speaker 30G to output 45% of the maximum intensity by controlling the amplifier 32 and the mixer 34. As a result, from the position of the occupant P, the occupant P can feel as if the sound image were localized to the spatial position MP2 illustrated in FIG. 11. In this way, by adjusting the volumes of sounds output from the plurality of speakers and each speaker provided inside the vehicle, it is possible to change the position to which the sound image is localized. More specifically, since the position to which the sound image is localized is determined based on sound features of the sound source, information regarding a vehicle interior environment, and a head-related transfer function (HRTF), the voice controller 118 localizes the sound image to a predetermined position by controlling the speaker unit 30 at an optimum output distribution obtained in advance by sensory evaluation or the like.

[Flowcharts]

Figure 12:
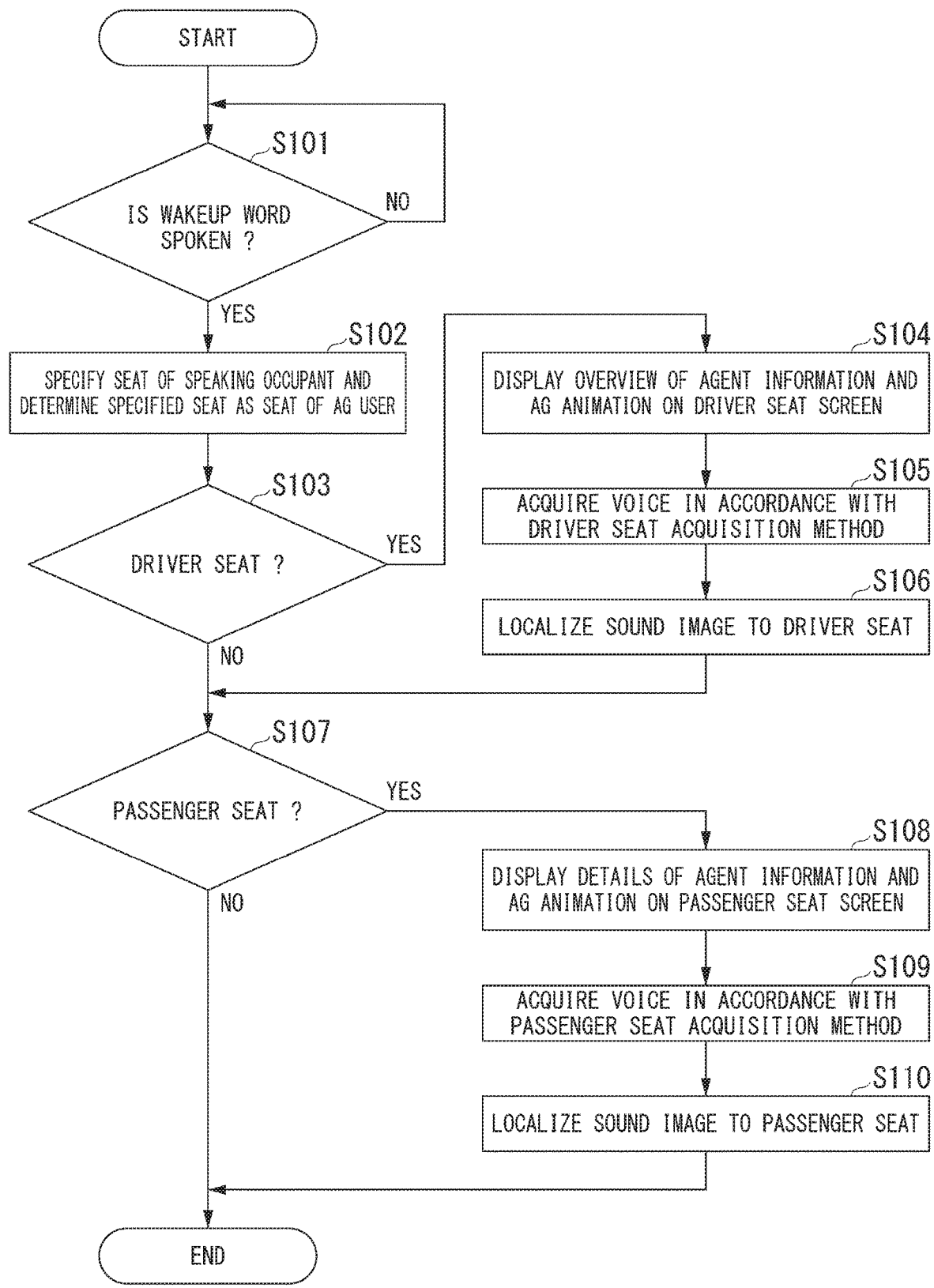
FIG. 12 is a flowchart illustrating an example of a process at the time of activation of an agent functional unit.

FIG. 12 is a flowchart illustrating an example of a process at the time of activation of the agent functional unit 150. The agent device 100 determines whether a wakeup word is spoken (step S101). When the wakeup word is spoken, the agent functional unit 150 is activated. Then, the manager 110 specifies a seat of the occupant speaking the wakeup word and determines the specified seat as the seat of the AG user (step S102). Subsequently, the manager 110 determines whether the determined seat of the AG user is the driver seat DS (step S103). When the seat of the AG user is the driver seat DS, the display controller 116 displays an overview of the agent information and the AG animation on the driver seat screen 501 (step S104). The voice acquirer 111 starts control to acquire a voice in accordance with the driver seat acquisition method (step S105). The voice controller 118 starts control localization of the sound image to a position at which the occupant on the driver seat DS is predicted to feel as if the AG animation displayed on the first display 21 were speaking the agent voice (step S106).

Conversely, when the determined seat of the AG user is not the driver seat DS in step S103, the manager 110 determines whether the determined seat of the AG user is the passenger seat AS (step S107). When the seat of the AG user is the passenger seat AS, the display controller 116 displays the details of the agent information and the AG animation on the passenger seat screen 601 (step S108). The voice acquirer 111 starts controlling acquisition of the voice in accordance with the passenger seat acquisition method (step S109). The voice controller 118 starts controlling the localization of the sound image to a position at which the occupant on the passenger seat AS is predicted to feel as if the AG animation displayed on the second display 22 were speaking the agent voice (step S110).

Figure 13:
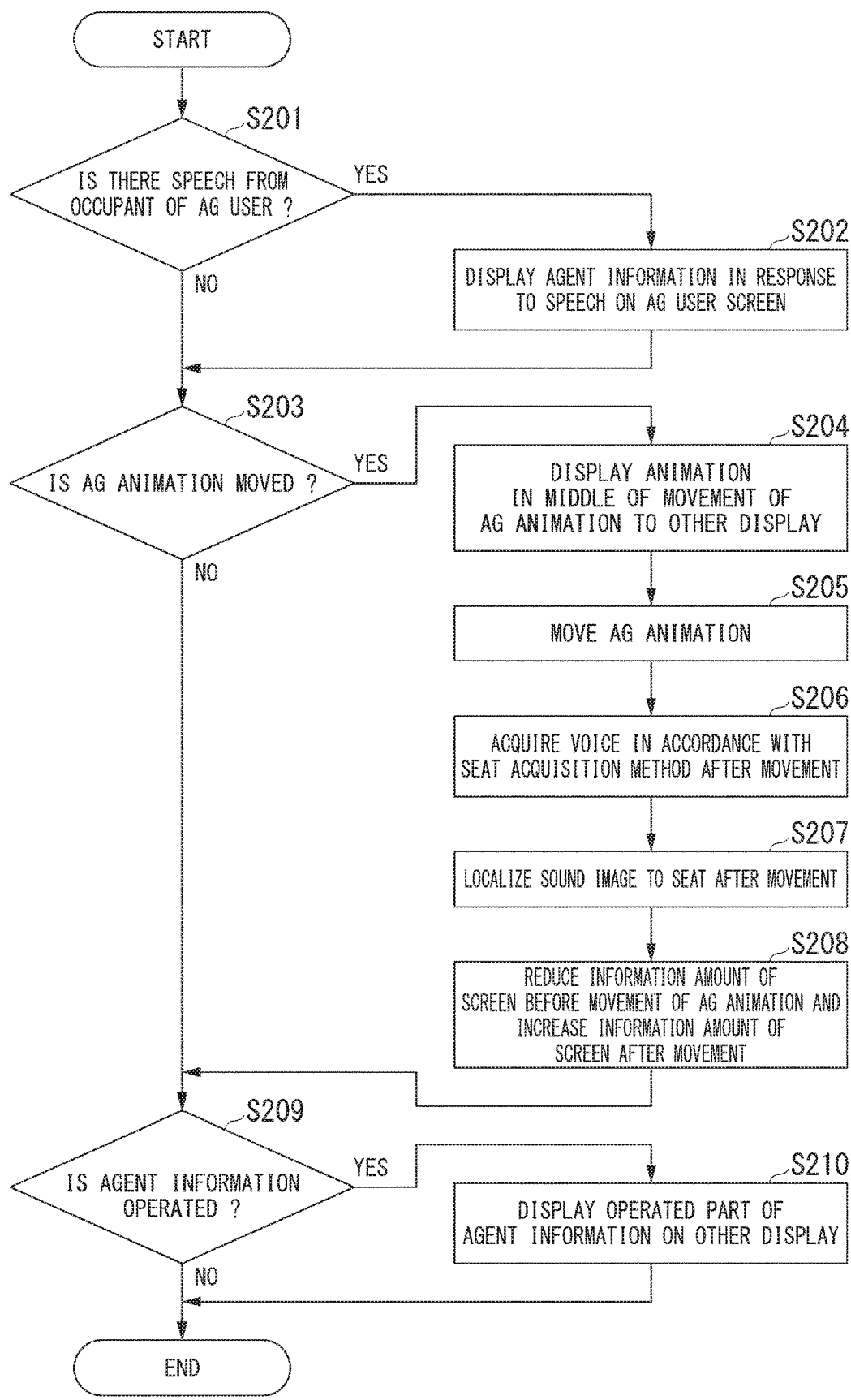
FIG. 13 is a flowchart illustrating an example of a process after the activation of the agent functional unit.

FIG. 13 is a flowchart illustrating an example of a process after the activation of the agent functional unit 150. The agent device 100 repeats a process to be described below at a predetermined timing. The description of a process in which a service is provided by the agent functional unit 150 will be omitted.

First, the agent functional unit 150 determines whether there is a speech from an occupant who is the AG user (step S201). When there is the speech from the occupant who is the AG user, the display controller 116 displays the agent information in response to the speech of the occupant who is the AG user on the AG user screen (step S202). Here, the display controller 116 may cause the AG animation displayed on the display to perform an action in response to the speech of the occupant who is the AG user.

Conversely, when there is no speech from the occupant who is the AG user in step S201, the instruction receiver 115 determines whether to receive an instruction to move the AG animation (step S203). When the instruction to move the AG animation is received, the display controller 116 moves the AG animation to the other display (step S205), while displaying the animation in the middle of movement of the AG animation to the other display on both the displays (step S204). The voice acquirer 111 starts controlling acquisition of a voice in accordance with a seat acquisition method corresponding to the other display to which the AG animation is moved (step S206). The voice controller 118 starts controlling localization of the sound image to a position at which the occupant is predicted to feel as if the AG animation moved to the other display were speaking the agent voice (step S207). Then, when the agent information is changed with the movement of the AG animation, for example, the display controller 116 reduces an information amount of the agent information of the screen before the movement of the AG animation and increases an information amount of the agent information of the screen after the movement of the AG animation (step S208).

Conversely, when the instruction to move the AG animation is not received in step S203, the instruction receiver 115 determines whether a part of the agent information of the screen on which the AG animation is displayed is operated (step S209). When the part of the agent information is operated, the display controller 116 displays the operated part of the agent information on the other display (the display on which the AG animation is not displayed) (step S210).

Figure 14:
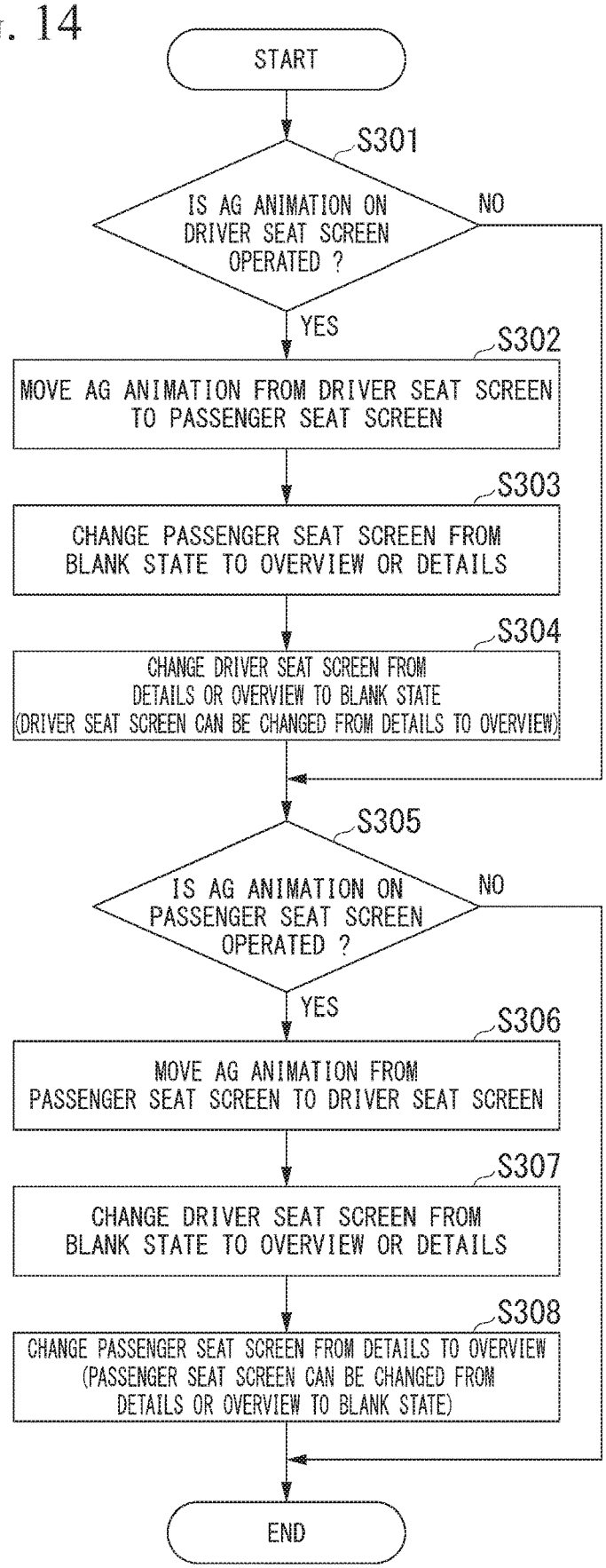
FIG. 14 is a flowchart illustrating an example of a display control process when an instruction to move the AG animation is received.

FIG. 14 is a flowchart illustrating an example of a display control process when an instruction to move the AG animation is received. Here, an example in which the instruction to move the AG animation is an operation of touching the AG animation displayed on the display will be described.

The instruction receiver 115 determines whether the AG animation displayed on the driver seat screen 501 is a touch operation (step S301). When the AG animation displayed on the driver seat screen 501 is touched, the display controller 116 moves the AG animation to the passenger seat screen 601 while displaying the animation in the middle of movement of the AG animation from the driver seat screen 501 to the passenger seat screen 601 (step S302). The display controller 116 displays the details (or an overview) of the agent information on the passenger seat screen 601 which is in a blank state (a state in which information regarding the agent is not displayed) (step S303). Further, when the details of the agent information are displayed on the driver seat screen 501, the display controller 116 changes the details of the agent information to the overview of the agent information or a blank state (step S304). When the overview of the agent information is displayed on the driver seat screen 501 in step S304, the display controller 116 may change the overview of the agent information to the blank state. That is, in step S304, the display is changed so that the information amount of the agent information displayed on the driver seat screen 501 is decreased.

Conversely, when the AG animation displayed on the driver seat screen 501 is not touched in step S301, the instruction receiver 115 determines whether the AG animation displayed on the passenger seat screen 601 is touched (step S305). When the AG animation displayed on the passenger seat screen 601 is touched, the display controller 116 moves the AG animation to the driver seat screen 501 while displaying the animation in the middle of movement of the AG animation from the passenger seat screen 601 to the driver seat screen 501 (step S306). The display controller 116 displays an overview (or the details) of the agent information on the driver seat screen 501 which is in the blank state (step S307). Further, when the details of the agent information are displayed on the passenger seat screen 601, the display controller 116 changes the details of the agent information to an overview of the agent information or the blank state (step S308). When the overview of the agent information is displayed on the passenger seat screen 601 in step S308, the display controller 116 may change the overview of the agent information to the blank state. That is, in step S308, display is changed so that the information amount of the agent information displayed on the passenger seat screen 601 is decreased.

The present invention is not limited thereto. When the AG animation displayed on the passenger seat screen 601 is moved to the driver seat screen 501, the agent information displayed on the passenger seat screen 601 may be displayed as it is or the agent information may not be displayed on the driver seat screen 501.

The agent device 100 according to the above-described first embodiment can realize the in-vehicle display in an appropriate aspect when the agent provides a service.

The embodiments for carrying out the present invention have been described above, but the present invention is not limited to the embodiments. Various modifications and substitutions can be made within the scope of the present invention without departing from the gist of the present invention.

For example, the passenger seat screen may be displayed on the third display 23.

What is claimed is:

1. An agent device comprising:
 a hardware processor executing software, hardware including circuitry, or a cooperation of the software and the hardware configured to provide a service including an output of a response by sound in response to a speech of an occupant of a vehicle; and
 a display controller configured to cause a display provided in the vehicle to display an animation regarding an agent corresponding to the hardware processor executing the software, the hardware, or the cooperation of the software and the hardware,
 wherein the display controller moves the animation between a first display area included in the display and a second display area of which a position is different from a position of the first display area in the vehicle in response to an instruction from the occupant,
 wherein the hardware processor executing the software, the hardware, or the cooperation of the software and the hardware acquires a speech of the occupant based on an output from one or more microphones provided in the vehicle and causes directivity at a time of acquisition of the speech of the occupant to differ between a case in which the animation is displayed in the first display area and a case in which the animation is displayed in the second display area, and
 wherein the hardware processor executing the software, the hardware, or the cooperation of the software and the hardware causes the directivity at the time of acquisition of the speech of the occupant to differ from the case in which the animation is displayed in the second display area in a case in which the microphones are provided in each of a driver seat and a passenger seat and in which the animation is displayed in the first display area by turning on the microphone on a side of the driver seat and turning off the microphone on a side of the passenger seat.

2. The agent device according to claim 1,
 wherein the display controller causes the display to display the animation in one of the first display area and the second display area based on a position at which an occupant speaks in the vehicle.

3. The agent device according to claim 1,
 wherein the hardware processor executing the software, the hardware, or the cooperation of the software and the hardware provides the service based on the display area in which the animation is displayed between the first display area and the second display area and a speech by an occupant of a seat to which a position assumed to be a head of a sitting occupant is closest.

4. The agent device according to claim 1,
 wherein a position of the first display area in the vehicle is closer to a position at which a head of a driver is assumed to be located than the second display area is.

5. The agent device according to claim 1,
 wherein the display controller moves the animation in response to a touch operation on the animation when a detector that is integrated with the display and that detects a touch operation detects at least the touch operation on the animation.

6. The agent device according to claim 1,
 wherein, when the animation is moved from one display area to another display area, the display controller causes the display to display the animation in the middle of movement by the agent from the one display area to the other display area.

7. The agent device according to claim 1,
 wherein the display controller causes the display type of the agent information to differ in response to movement of the animation between a case in which the agent information is displayed in the first display area and a case in which the agent information is displayed in the second display area.

8. The agent device according to claim 1, wherein the display controller causes the display type of the agent information to differ so that an information amount of the agent information differs.

9. The agent device according to claim 1, wherein the display controller causes the display to display details of the agent information in the display area to which the animation is moved between the first display area and the second display area and causes the display to display an overview of the agent information in the display area in which the animation is displayed before the movement.

10. The agent device according to claim 1, wherein the display controller changes display of the first display area to information which is based on part of the agent information designated by the occupant when the occupant designates the part of the agent information displayed in the second display area.

11. The agent device according to claim 1, wherein the display controller moves the animation between the first display area and the second display area depending on a driving situation of the vehicle.

12. The agent device according to claim 11, wherein the display controller moves the animation between the first display area and the second display area in a case in which a first condition, that is, turning of a curve, a speed per hour equal to or greater than a threshold, traveling in a highway, traveling in a residential area, changing of a lane, passing of a front vehicle, or changing of a destination is satisfied, and in a case in which the first condition is not satisfied or a second condition, that is, running in a straight line after turning a curve, a speed per hour equal to or greater than a threshold, or getting in a highway is satisfied.

13. The agent device according to claim 1, wherein the first display area is located closer to a driver seat than the second display area.

14. The agent device according to claim 1, wherein the display further includes a third display area which is distant toward a back side of the vehicle from the first display area and the second display area, and wherein when a flick operation is performed on a screen of the first display area or the second display area upward or downward, the animation is configured to be moved from the first display area or the second display area to the third display area.

15. A method of controlling an agent device, the method causing a computer:
to provide a service including an output of a response by sound in response to a speech of an occupant of a vehicle by an agent function;
to cause a display provided in the vehicle to display an animation regarding an agent corresponding to the agent function by a display controller;
to move the animation between a first display area included in the display and a second display area of which a position is different from a position of the first display area in the vehicle in response to an instruction from the occupant,
to acquire a speech of the occupant based on an output from one or more microphones provided in the vehicle and to cause directivity at a time of acquisition of the speech of the occupant to differ between a case in which the animation is displayed in the first display area and a case in which the animation is displayed in the second display area, and
to cause the directivity at the time of acquisition of the speech of the occupant to differ from the case in which the animation is displayed in the second display area in a case in which the microphones are provided in each of a driver seat and a passenger seat and in which the animation is displayed in the first display area by turning on the microphone on a side of the driver seat and turning off the microphone on a side of the passenger seat.

16. A computer-readable non-transitory storage medium that stores a program causing a computer:
to provide a service including an output of a response by sound in response to a speech of an occupant of a vehicle by an agent function;
to cause a display provided in the vehicle to display an animation regarding an agent corresponding to the agent function by a display controller;
to move the animation between a first display area included in the display and a second display area of which a position is different from a position of the first display area in the vehicle in response to an instruction from the occupant,
to acquire a speech of the occupant based on an output from one or more microphones provided in the vehicle and to cause directivity at a time of acquisition of the speech of the occupant to differ between a case in which the animation is displayed in the first display area and a case in which the animation is displayed in the second display area, and
to cause the directivity at the time of acquisition of the speech of the occupant to differ from the case in which the animation is displayed in the second display area in a case in which the microphones are provided in each of a driver seat and a passenger seat and in which the animation is displayed in the first display area by turning on the microphone on a side of the driver seat and turning off the microphone on a side of the passenger seat.

\* \* \* \* \*